United States Patent [19]
Abe

[11] Patent Number: 6,061,329
[45] Date of Patent: May 9, 2000

[54] MULTIPLEX TRANSMISSION SYSTEM AND APPARATUSES FOR SAME

[75] Inventor: Satoru Abe, Kawasaki, Japan

[73] Assignee: Fujitsu Limited, Kanagawa, Japan

[21] Appl. No.: 08/915,012

[22] Filed: Aug. 20, 1997

[30] Foreign Application Priority Data

Mar. 19, 1997 [JP] Japan .................................. 9-066896

[51] Int. Cl.$^7$ ...................................................... H04L 1/22
[52] U.S. Cl. ...................................... 370/228; 340/825.01
[58] Field of Search .................................... 370/242, 243, 370/244, 247, 248, 250, 251, 252, 228, 227; 340/825.01

[56] References Cited

U.S. PATENT DOCUMENTS

| 5,631,896 | 5/1997 | Kawase et al. ......................... | 370/228 |
| 5,721,727 | 2/1998 | Ashi et al. ............................... | 370/244 |

FOREIGN PATENT DOCUMENTS 7-226729  8/1995  Japan .

*Primary Examiner*—Douglas W. Olms
*Assistant Examiner*—Ken Vanderpuye
*Attorney, Agent, or Firm*—Helfgott & Karas, PC.

[57] ABSTRACT

An SDH multiplex transmission system has a transmission terminal apparatus and a reception terminal apparatus that are connected to each other through channels of an N+1 redundant structure. The transmission terminal apparatus loads predetermined information that violates SDH standards into the overhead of an STM frame and transmits the same to a spare channel that is not currently used. The reception terminal apparatus monitors an STM frame received through the spare channel, and when the predetermined information in the overhead thereof satisfies a predetermined violation detection condition, determines that the spare channel is unused. The violation information is byte information such as H1, MS-REI, or STM-ID. As a result, the SDH multiplex transmission system has a simple structure to let the reception terminal apparatus correctly determine whether or not the spare channel is used.

17 Claims, 17 Drawing Sheets

| NDF EN | NOR NDF | INV NDF |
|--------|---------|---------|
| 1001   | 0110    | 0000    |
| 0001   | 1110    | 0011    |
| 1101   | 0010    | 0101    |
| 1000   | 0111    | 1100    |
|        |         | 1111    |
|        |         | 1010    |

Fig.5B

| NO | STATE TRANSITION | TRANSITION CONDITIONS |
|---|---|---|
| (1) | NORMAL STATE → AIS STATE | DETECTING AU-AIS INDICATION IN 3 CONSECUTIVE FRAMES |
| (2) | AIS STATE → NORMAL STATE | DETECTING SAME NOR PTR IN 3 CONSECUTIVE FRAMES DETECTING NDF EN PTR |
| (3) | NORMAL STATE → LOP STATE | DETECTING INV PTR IN 8 CONSECUTIVE FRAMES DETECTING NDF EN PTR IN 8 CONSECUTIVE FRAMES |
| (4) | LOP STATE → NORMAL STATE | DETECTING SAME NOR PTR IN 3 CONSECUTIVE FRAMES |
| (5) | AIS STATE → LOP STATE | DETECTING INV PTR IN 8 CONSECUTIVE FRAMES DETECTING NDF EN PTR IN 9 CONSECUTIVE FRAMES |
| (6) | LOP STATE → AIS STATE | DETECTING AU-AIS INDICATION IN 3 CONSECUTIVE FRAMES |
| (7) | NORMAL STATE → NORMAL STATE | DETECTING NDF EN PTR DETECTING NOR PTR IN 3 CONSECUTIVE FRAMES DETECTING INC INDICATION DETECTING DEC INDICATION |

| ERROR COUNT | 1 2 3 4 5 6 7 8 |
|---|---|
| 0 | 1 0 0 0 0 0 0 0 |
| 1 | 1 0 0 0 0 0 0 1 |
| 2 | 1 0 0 0 0 0 1 0 |
| 3 | 1 0 0 0 0 0 1 1 |
| 4 | 1 0 0 0 0 1 0 0 |
| 5 | 1 0 0 0 0 1 0 1 |
| 6 | 1 0 0 0 0 1 1 0 |
| 7 | 1 0 0 0 0 1 1 1 |
| 8 | 1 0 0 0 1 0 0 0 |
| 9 | 1 0 0 0 1 0 0 1 |
| ⋮ | ⋮ |
| 22 | 1 0 0 1 0 1 1 0 |
| 23 | 1 0 0 1 0 1 1 1 |
| 24 | 1 0 0 1 1 0 0 0 |
| 25 | 1 0 0 1 1 0 0 1 |
| ⋮ | ⋮ |
| 127 | 1 1 1 1 1 1 1 1 |

INV MS-REI

| FRAME NUMBER | TRACE DATA | | | | | | | |
|---|---|---|---|---|---|---|---|---|
| | MSB | 2 | 3 | 4 | 5 | 6 | 7 | LSB |
| 0 | $F_0$ | $C_1$ | $C_2$ | $C_3$ | $C_4$ | $C_5$ | $C_6$ | $C_7$ |
| 1 | $F_1$ | $X_{11}$ | $X_{12}$ | $X_{13}$ | $X_{14}$ | $X_{15}$ | $X_{16}$ | $X_{17}$ |
| ⋮ | ⋮ | ⋮ | ⋮ | ⋮ | ⋮ | ⋮ | ⋮ | ⋮ |
| 14 | $F_E$ | $X_{E1}$ | $X_{E2}$ | $X_{E3}$ | $X_{E4}$ | $X_{E5}$ | $X_{E6}$ | $X_{E7}$ |
| 15 | $F_F$ | $X_{F1}$ | $X_{F2}$ | $X_{F3}$ | $X_{F4}$ | $X_{F5}$ | $X_{F6}$ | $X_{F7}$ |

MULTIPLEX TRANSMISSION SYSTEM AND APPARATUSES FOR SAME

BACKGROUND OF THE INVENTION

1. Field of the Invention

The present invention relates to an SDH multiplex transmission system and apparatuses for the same. In particular, the present invention relates to an SDH multiplex transmission system having a transmission terminal apparatus and a reception terminal apparatus that are connected to each other through channels of an N+1 redundant structure.

Recently, many communication networks have begun to employ an SDH (Synchronous Digital Hierarchy), and not only optical transmission apparatuses but also radio transmission apparatuses are shifting from PDH (Plesicohronous Digital Hierarchy) to SDH.

2. Description of the Related Art

FIG. 14 shows the structure of a PDH digital multiplex radio transmission system according to a prior art.

In the figure, terminal apparatuses 300 and 400 are connected to each other through radio channels with or without a relay (not shown) between them. The terminal apparatuses 300 and 400 have each a pair of transmission and reception terminal apparatuses 300T (400T) and 300R (400R) for each upward and downward channel, to realize two-way communication.

In the transmission terminal apparatus 300T, TBBIF is a transmitting terminal baseband interface, TSW is a transmit switch for radio protection, MOD is a modulator, TX is a transmitter, TBSC is a transmitting terminal baseband switch control, TTCU is a transmitting terminal timing control unit, and PG is a pattern generator. In the reception terminal apparatus 400R, RX is a receiver, DEM is a demodulator, RSW is a receive switch for radio protection, RBBIF is a receiving terminal baseband switch control, RBSC is a receiving terminal baseband switch control, RTCU is a receiving terminal timing control unit, and PD is a pattern detector.

The system of this type generally employs an N+1 (2+1 in the figure) redundant structure. If a current channel MCH1 or MCH2 causes a communication fault due to, for example, fading, the current channel is switched to a spare channel PCH to continue communication. The switching time must keep a level of 10 msec to follow a fading speed. Even if a channel is switched to another, frame synchronization between the transmission and reception terminal apparatuses must be maintained. To achieve this, the data transmission phase of each channel is adjusted according to respective frame synchronization signals FP.

More precisely, a main signal MCH1 (represented with the same mark as the current channel MCH1) in the upward channel is stored in an elastic buffer (not shown) in the interface TBBIF1 according to a clock signal CLK' that has been received and regenerated. Thereafter, the stored signal is sequentially read in synchronization with the frame synchronization signal FP of the terminal timing control unit TTCU according to a clock signal CLK. The signal MCH1 is passed through the switch TSW1 to the modulator MOD1, which modulates the signal into a radio signal according to, for example, a multivalued QAM, and the radio signal is transmitted by the transmitter TX1. On the reception side, the signal MCH1 is received and amplified by the receiver RX1 and is demodulated by the demodulator DEM1 into a digital signal. The digital signal is passed through the switch RSW1 to the interface RBBIF1 and is once stored in an elastic buffer (not shown) in the interface RBBIF1 according to a clock signal CLK' that has been received and regenerated. The same handling is applied to the main signal MCH2. In this way, phase synchronization in the radio transmission section is achieved to realize instantaneous switching to and from the spare channel.

FIG. 15 explains channel switching control according to the prior art.

If the demodulator DEM1 of a reception terminal station detects a radio fault in the current channel MCH1, the detected fault is informed to the switch controller RBSC, which starts processes from step S11. Step S11 checks the spare system PCH (channel, demodulator DEMP, etc.) to see if there is a fault. If there is no fault, step S12 checks the spare system to see if it is used by another current system. If it is not used, step S13 uses the downward channel to send a switching instruction to the switch TSW1 of a transmission terminal station. Step S14 waits for a switching acknowledgment for the switch TSW1 from the transmission terminal station.

Upon receiving the switching instruction, the transmission terminal station switches the switch TSW1 to the spare system in step S1, and step S2 returns a switching acknowledgment related to the switch TSW1 to the reception terminal station.

The switch controller RBSC of the reception terminal station confirms the acknowledgment in step S14 and sends a switching instruction to the switch RSW1 in step S15. Step S16 waits for a switching acknowledgment from the switch RSW1, and upon receiving it, enters a channel switching completed state.

If step S11 finds a fault in the spare system, or if step S12 finds that the spare system is used by another current system, or if step S1 fails to operate the switch TSW1 and step S15 confirms no acknowledgment, or if step S15 fails to operate the switch RSW1 and step S16 confirms no acknowledgment, there will be a channel switching impossible state.

In this way, the system having the N+1 redundant structure must make, if the reception terminal station detects a fault in a current channel, the switch controller RBSC transmit a channel switching instruction to the transmission terminal station only after checking to see, at least, if a spare channel has no trouble in receiving signals and if the spare channel is available.

In this regard, the switch controller RBSC of the reception terminal station may receive the reception fault information directly from the demodulator DEMP, but however, is unable to directly receive the spare channel availability information because it is originally in the switch controller TBSC of the transmission terminal station.

Although there is a way to receive channel control information from the switch controller TBSC, it involves complicated communication control, and there is no guarantee that the channel control information in the transmission terminal station is equal to an actual channel switching state.

Accordingly, the prior art checks to see if the spare channel is available according to the method disclosed below.

FIG. 16 partly shows the structure of the radio transmission system of the prior art and, more precisely, the details of the structure of a part shown in FIG. 14 for determining whether or not a spare channel is available.

The switches TSWP and RSWP of FIG. 14 are required when using the spare channel for an occasional purpose and are not directly related to the following explanation, and therefore, they are omitted.

In the figure, TPNG is a transmitting terminal pattern generator of the transmission terminal station, RPNG is a receiving terminal pattern generator of the reception terminal station, and CMP is a comparator.

The pattern generator TPNG generates dummy random data PN in synchronization with the frame synchronization signal FP of its own station according to the clock signal CLK. The data PN is used to stop a signal level deviating to one side. When a switching signal TSC1 from the switch controller TBSC is 0 to indicate no switching, the switch TSW1 is in a connection state shown in the figure, the main signal MCH1 input to the switch TSW1 is connected to the modulator MOD1, and the data PN from the lower part of the figure (a through line) is connected to the modulator MODP. These conditions are the same for the switch TSW2 which receives the main signal MCH2.

Accordingly, if no channel switching is carried out, the main signals MCH1 and MCH2 are connected to the current channels, respectively, and the dummy random data PN generated by the signal generator TPNG passes through the line that runs through the switches TSW1 and TSW2 and reaches the modulator MODP of the spare system, which adds a frame synchronization signal SYN to the data PN and transmits the same to the spare channel PCH.

The demodulator DEMP of the reception terminal station synchronizes a received frame, regenerates a frame synchronization signal FP' and a clock signal CLK' and, accordingly, reproduces the dummy random data PN. On the other hand, the signal generator RPNG of the reception terminal station independently generates dummy random data PN', which is identical to the received data PN, in synchronization with the frame synchronization signal FP' and according to the clock signal CLK'. The comparator CMP compares the received data PN with the generated data PN' of its own station. If the transmission terminal station carries out no channel switching, PN=PN', and in this case, the comparator CMP provides the switch controller RBSC with a decision signal PDALM=0 to indicate that the spare channel is unused. If the spare channel has been switched to any one of the current channels MCH1 and MCH2, the data PN in the channel MCH1 or MCH2 is not equal to PN', and therefore, the comparator CMP provides the switch controller RBSC with a decision signal PDALM=1 to indicate that the spare channel is in use.

The dummy random signal generators contained in the pattern generator PG and pattern detector PD are generally expensive and must be devices that do not quickly determine disagreement (PN being not equal to PN') on a minor bit error found in the received PN, for the safe management of the system. These factors further complicate the structure of the pattern detector PD and increase the cost of the apparatuses.

A wired SDH system transmits K1 and K2 bytes between transmission and reception terminal apparatuses, to carry out APS (Automatic Protection Switch) control on a current channel that has a fault. In this case, it is also necessary for a reception terminal station to grasp whether or not a spare channel is available in advance. Namely, the present invention is applicable not only to the radio SDH systems but also to wired SDH systems.

In the wired SDH system, a required switching speed is about 50 msec, and therefore, the APS control is not applicable as it is to the radio SDH systems because it is unable to follow the fading speed of the radio SDH systems.

In view of the prior art mentioned above, an object of the present invention is to provide an SDH multiplex transmission system employing a simple structure to allow a reception terminal station correctly determine whether or not a spare channel is used, as well as transmission apparatuses for the system.

SUMMARY OF THE INVENTION

The above object is accomplished with, for example, the structure shown in FIG. 1. Namely, a first aspect of the present invention provides an SDH multiplex transmission system having a transmission terminal apparatus and a reception terminal apparatus that are connected to each other through channels of an N+1 redundant structure. The transmission terminal apparatus transmits an STM frame to a spare channel PCH that is not used as a current channel, after loading predetermined information based on SDH standards into the overhead of the STM frame. The reception terminal apparatus monitors an STM frame received through the spare channel PCH, and if the predetermined information in the overhead thereof satisfies a predetermined violation detection condition, determines that the spare channel PCH is not used as a current channel.

It is preferable for the SDH system to transfer STM frames through a spare channel, even if the spare channel is unused, to establish reception synchronization therein in advance. The first aspect of the present invention uses overhead of an STM frame to load predetermined information (for example, violation information) therein and transmits the STM frame through the spare channel, to let the reception terminal apparatus know that the spare channel is available. For a spare channel that is used as a current channel, the first aspect of the present invention transfers a regular main signal through the spare channel, to let the reception terminal apparatus know that the spare channel is currently used. Inserting and identifying such violation information is achievable with a relatively simple structure and leads to the effective use of STM frames.

Inserting and extracting the violation information to and from a spare channel may be realized in various ways. For example, the violation information may be added to the end of a through line. In this case, the violation information is automatically inserted and extracted and linked with the operation of transmitting switches TSW1 and TSW2. Instead of linking with the ON/OFF operations of control signals for the switches, a violation information signal may be extinguished or generated with a separate circuit, and the violation information signal, instead of the signal in the through line, may be supplied to a transmitter TXP of the spare channel.

The information that violates the SDH standards includes various pieces of information that are out of fixed values (bit patterns) or a fixed range of values specified by the SDH standards, except frame synchronization bytes A1 and A2. The timing of fixing values according to the SDH standards is unquestioned.

Even if a transmission terminal station sends regular information, transmission errors along the way may cause a reception terminal station to find violation information. Contrary, even if the transmission terminal station sends violation information, the reception terminal station may find regular information. Accordingly, a predetermined violation detection condition is satisfied, preferably, when the violation information is continuously detected several times. The same is applied to detect regular information.

According to a second aspect of the present invention, the transmission terminal apparatus of the first aspect loads information based on the standards into an H1 byte (AU pointer) of an overhead and transmits it. The reception terminal apparatus monitors a predetermined violation condition on the H1 byte of a received overhead.

According to a third aspect of the present invention, the transmission terminal apparatus of the first aspect loads violation information into an MS-REI byte of an overhead and transmits the same. The reception terminal apparatus monitors a predetermined violation condition on the MS-REI byte of a received overhead.

According to a fourth aspect of the present invention, the transmission terminal apparatus of the first aspect loads violation information into an STM-ID byte of an overhead and transmits the same. The reception terminal apparatus monitors a predetermined violation condition on the STM-ID byte of a received overhead.

The SDH standards already define the bit patterns of the byte information and a range of values taken by the byte information, and therefore, the second to fourth aspects of the present invention add violation information to these pieces of byte information and use the violation information to efficiently determine whether or not a spare channel is used.

The above-mentioned object is also accomplished by, for example, a structure shown in FIGS. 10 and 11. This is an SDH multiplex transmission system according to a fifth aspect of the present invention, employing a transmission terminal apparatus and a reception terminal apparatus that are connected to each other through channels of an N+1 redundant structure. The transmission terminal apparatus loads information, specific to a spare channel PCH that is not used as a current channel, into each RS section trace byte RS-ST of the multiplexed STM frames and transmits the frames to the spare channel. The reception terminal apparatus compares each RS section trace byte RS-ST obtained from multiplexed STM frames received through the spare channel with information of its own specific to the spare channel, and if they agree with each other, determines that the spare channel is not currently used.

According to the SDH standards, it is possible for the transmission and reception terminal apparatuses to load a character string consisting of 15 ASCII codes at the maximum into RS section trace bytes RS-ST of multiplexed STM frames for each channel and transfer the frames. Accordingly, a specific character string is set in advance for each channel between the transmission and reception terminal apparatuses, is transferred between the apparatuses, and is checked at the reception terminal apparatus.

This will be explained in detail with reference to FIG. 11B. The transmission terminal apparatus loads a character string of "APCH→BPCH" sequentially into RS-ST bytes of multiplexed STM frames and transfers the frames to the spare channel PCH that is unused. The reception terminal apparatus finds that the character string "APCH→BPCH" received through the spare channel PCH agrees with a character string of "APCH→BPCH" of its own station and characteristic to the spare channel, and therefore, determines that the spare channel PCH is not currently used. In a current channel MCH1, a received character string of "AMCH1→BMCH1" agrees with a character string of "AMCH1→BMCH1" of the reception terminal station and is specific to the channel MCH1.

If the transmission terminal apparatus switches the spare channel PCH to, for example, the current channel MCH1, the spare channel PCH transmits the character string of "AMCH1→BMCH1" authentically generated by the channel MCH1 for the channel MCH1 itself. As a result, the reception terminal apparatus receives, through the spare channel PCH, the character string of "AMCH1→BMCH1," which does not agree with the character string of "APCH→BPCH" specific to the spare channel PCH. As a result, it is determined that the spare channel PCH is used as a current channel.

According to a sixth aspect of the present invention, the transmission and reception terminal apparatuses of the fifth aspect connect to each other through radio channels of an N+1 redundant structure. In this case, the transmission terminal apparatus makes its own demodulator MODP for a spare channel insert information specific to the spare channel, and the reception terminal apparatus makes its own demodulator DEMP for the spare channel carry out comparison and coincidence detection operations.

Generally, a spare channel mainly serves as a spare for a main signal line, and therefore, is usually provided with no overhead processing function of its own. Even in such a case, using the modulator MODP and demodulator DEMP for the spare channel simply realizes the overhead processing function. In addition, a measure may be taken between the modulator and the demodulator, to effectively prevent, for example, an erroneous connection of signal cables between them.

The object of the present invention mentioned above will be accomplished with, for example, a structure shown in FIG. 12. This is an SDH multiplex transmission system according to a seventh aspect of the present invention, employing a transmission terminal apparatus and a reception terminal apparatus that are connected to each other through channels having an N+1 redundant structure. The transmission terminal apparatus transmits STM frames to a spare channel that is not used as a current channel after inverting BIP-24 parity bytes of every second STM frame. The reception terminal apparatus carries out a parity check on BIP-24 parity bytes of each STM frame received through the spare channel. If a predetermined parity error detection condition is satisfied, it is determined that the spare channel is not currently used.

The parity check based on BIP-24 parity bytes sometimes detects a parity error even on a received regular STM frame. Accordingly, the seventh aspect of the present invention inverts BIP-24 parity bytes (B2 bytes) of every second frame and transmits the frames to the spare channel that is unused. As a result, the reception terminal apparatus finds a forcible parity check error every time. This simple structure correctly detects whether or not the spare channel is currently used.

The object mentioned above is also accomplished with a structure shown in FIG. 3. This is a transmission terminal apparatus according to an eighth aspect of the present invention, of an SDH multiplex transmission system having channels of an N+1 redundant structure to connect the transmission terminal apparatus to a reception terminal apparatus. The transmission terminal apparatus has main signal lines for connecting input main signals to current channels MCH1 and MCH2 and a through signal line for connecting any one of the input main signals to a spare channel PCH. The transmission terminal apparatus further has an optional number (N) of switch modules SM that are insertable and extractable to and from the apparatus. Each of the switch modules integrally has a transmission channel switch TSW and a selector SEL. The switch TSW connects an input main signal line to an output main signal line and an input through signal line to an output through signal line if a channel switching signal TSC is extinguished, and if the signal TSC is energized, connects the input main signal line to the output through signal line and disconnects the input through signal line. The selector SEL is interposed in the input through signal line of the switch TSW, to connect an input through signal line to the input through signal line of the switch TSW if a selection signal is extinguished, and if the selection signal is energized, connects a signal supplied to a second input terminal to the input through signal line of the switch TSW. Only the selection signal to the last of the switch modules is energized (by applying a signal LAST) to apply a predetermined signal FXD to the through signal line of the N+1 redundant structure.

The eighth aspect of the present invention arranges, for example, two switch modules SM1 and SM2 in series in the transmission terminal apparatus as shown in the figure and energizes the selection signal (applying the signal LAST) to the last switch module SM2, to thereby simply form a system of 2+1 redundant structure that is able to apply a predetermined signal FXD to all through signal lines. Alternatively, eight switch modules SM1 to SM8, for example, may be installed in the transmission terminal apparatus, and by energizing only a selection signal to the last switch module SM8, there is formed a system of an 8+1 redundant structure with all through signal lines receiving a predetermined signal FXD. The eighth aspect, therefore, is capable of flexibly coping with a system of an optional N+1 redundant structure, and by using the standardized switch modules SM, providing an effect of mass-producing circuits and thus reducing the costs thereof.

According to a ninth aspect of the present invention, the predetermined signal applied to the second input terminal of the selector SEL is preferably fixed information that violates one, two, or more SDH standards related to an overhead.

The fixed information that violates two or more standards is fixed byte information that violates, for example, an H1 byte standard as well as an MS-REI byte standard. Accordingly, a single piece of violation information is usable for different types of check methods, or a single piece of information can be subjected to different types of check methods.

BRIEF DESCRIPTION OF THE DRAWINGS

FIGS. 5A and 5B are views explaining the radio transmission system according to the first embodiment;

DESCRIPTION OF THE PREFERRED EMBODIMENTS

Preferred embodiments of the present invention will be explained in detail with reference to accompanying drawings in which like parts are represented by like reference marks.

Figure 13A:
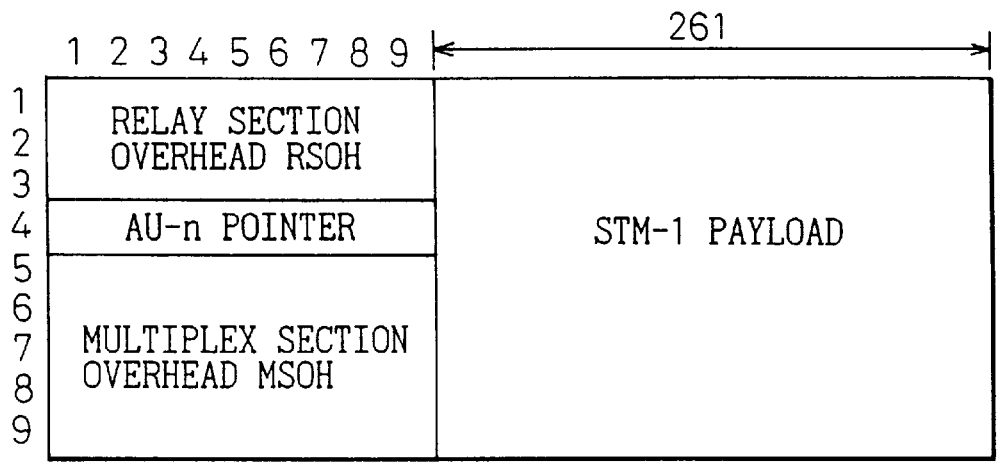
FIGS. 13A and 13B are views showing an STM-1 frame format.
Figure 13B:
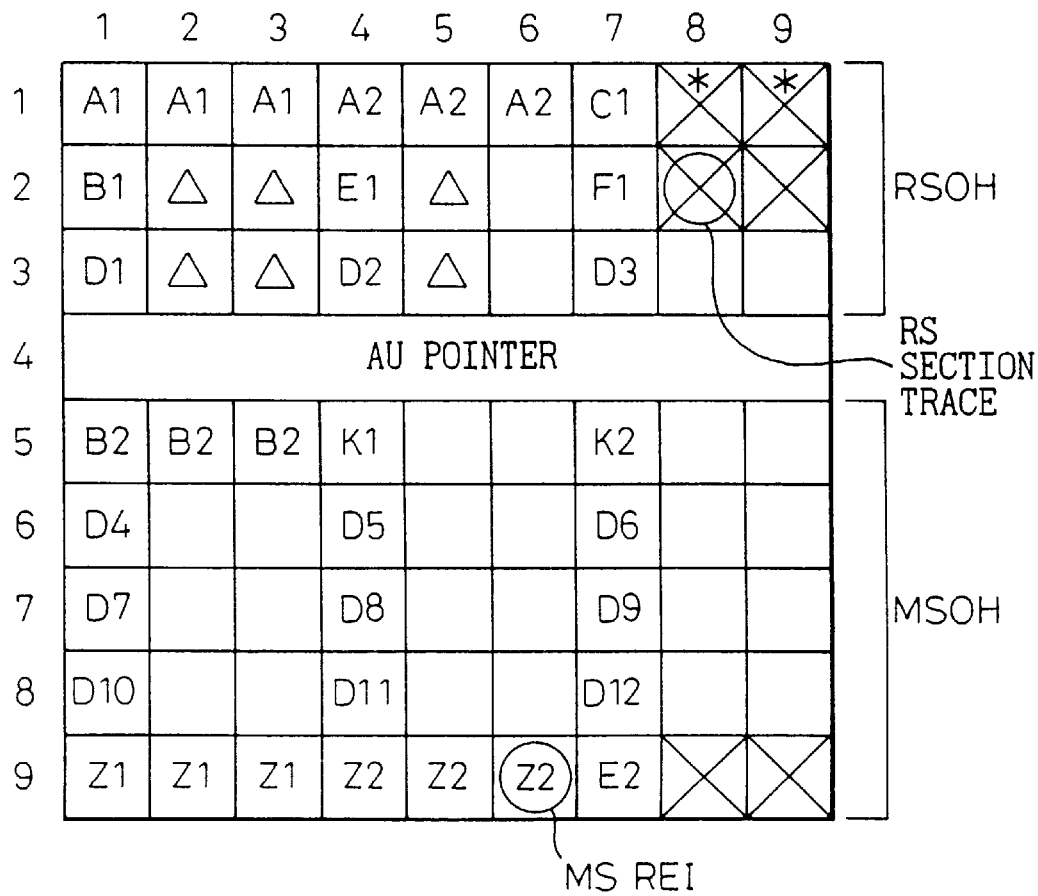
Figure 14:
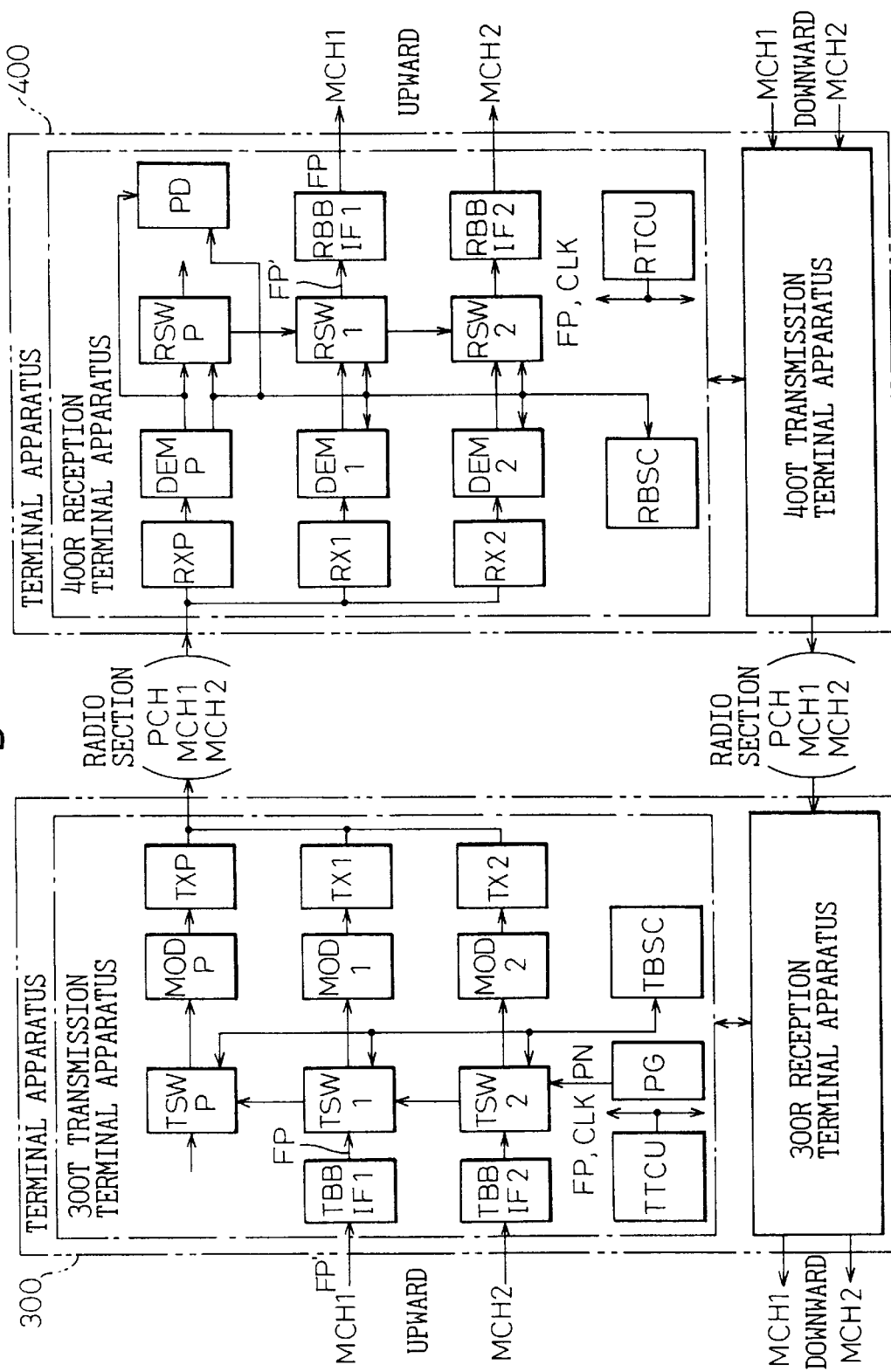
FIG. 14 is a view showing the structure of a PDH digital multiplex radio transmission system according to a prior art.
Figure 15:
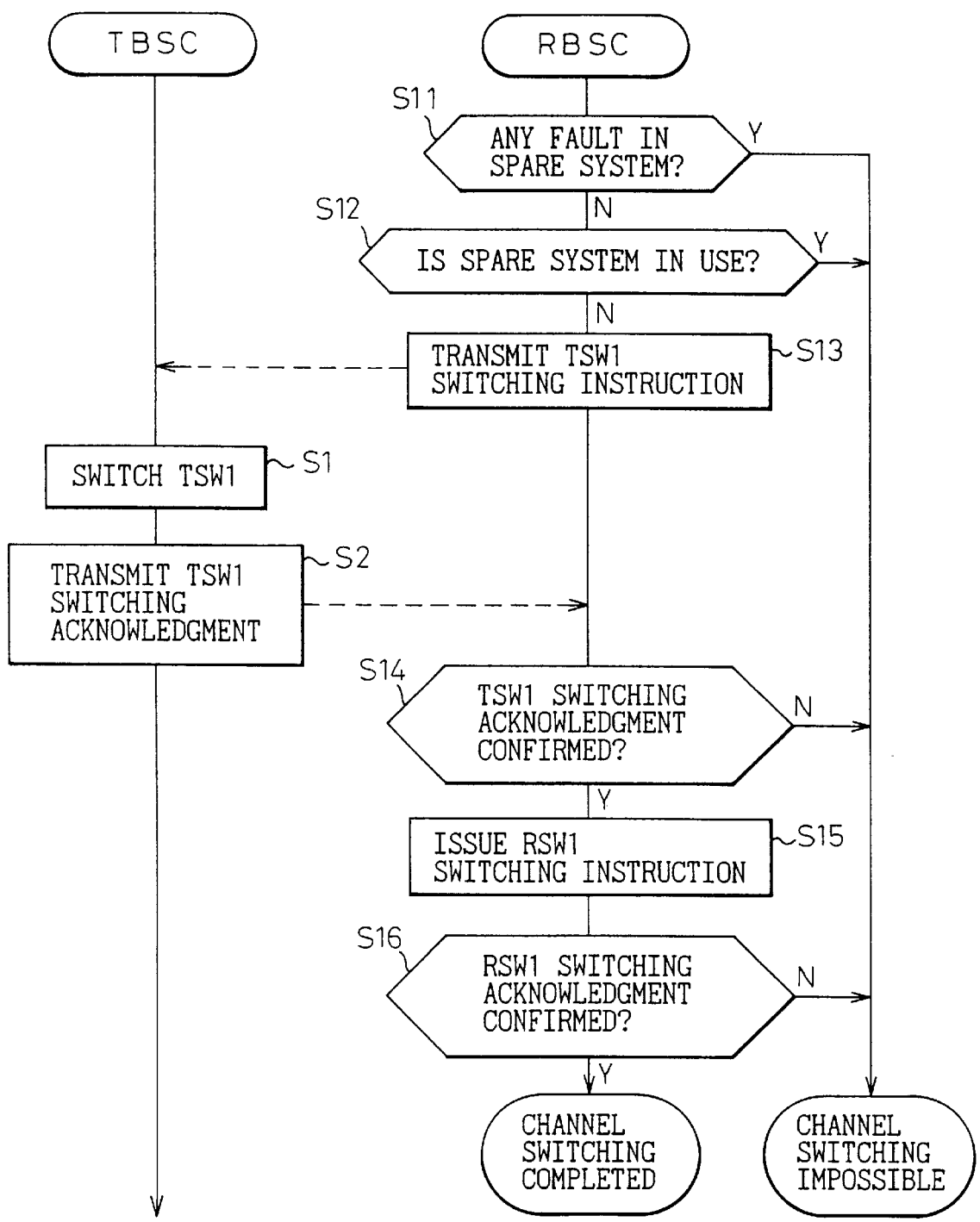
FIG. 15 is a view explaining channel switching control according to the prior art.
Figure 16:
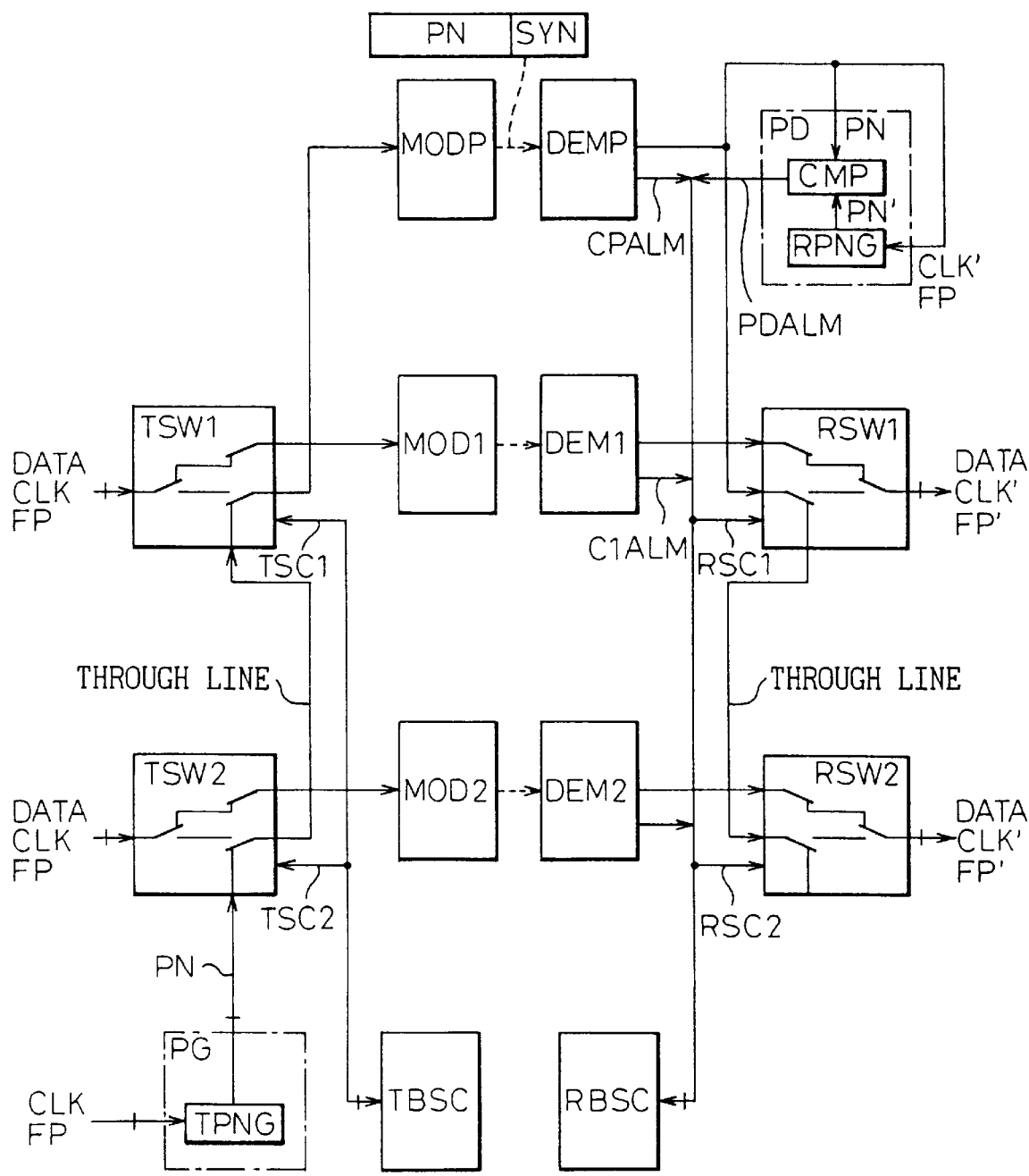
FIG. 16 is a view showing a part of the radio transmission system of the prior art.

FIGS. 13A and 13B show an STM-1 (Synchronous Transport Module Level One) frame format. Standards related to the format will be explained.

In FIG. 13A, STM-1 is a multiplexing unit, which is a base of SDH, and is expressed as a byte array of 9 rows and 270 columns. One frame period is 125 $\mu s$, and therefore, a bit rate is 9×270×8×1/125 $\mu s$=155.52 Mb/s. A first 9-row 9-column section contains a section overhead (SOH) and an AU pointer, and the following 9-row 261-column section is a payload that accommodates multiplexed information.

In FIG. 13B, a first 3-row 9-column section is called a relay section overhead (RSOH) and is used to manage data transmission between relays and between a relay and a terminal apparatus. Here, A1 and A2 are frame synchronization bytes involving fixed bit patterns of A1="11110110" and A2="00101000." In practice, a required number of bytes around a boundary between A1 and A2 are used for frame synchronization. C1 is an STM-N identification byte, and in the STM-1 frame, C1="00000001." B1 is a digital error monitoring byte based on a BIP (Bit Interleaved Parity)-8 method. A bit interleave operation is carried out on every eighth bit of all information of a scrambled "n"th frame and an obtained one-byte result (even parity) is inserted into a B1 byte of an "n+1"th frame which is not scrambled yet. E1 is a voice negotiation byte between relays and between a relay and a terminal apparatus, F1 is a byte freely used by a network manager, and D1 to D3 are data communication channel (DCC) bytes of 192 Kb/s for transferring monitor and control information between relays and between a relay and a terminal apparatus.

The fourth row is called the AU (administrative Unit) pointer, which administrates, for example, the position of a virtual container VC3/4 in the payload. The details of this will be explained later.

The following 5-row 9-column section is called a multiplex section overhead (MSOH) and is used to manage data transmission between terminal apparatuses. B2 is a digital error monitoring byte based on a BIP-24 method. A bit interleave parity operation is carried out on every 24th bit of all information, except RSOH, of an "n"th frame that is not scrambled yet, and an obtained 3-byte operation result (even parity) is inserted into B2 bytes of an "n+1"th frame that is not scrambled yet. K1 and K2 are channel automatic protection switch (APS) bytes that are used when a fault occurs in, for example, a channel or a relay, to display an alarm and communicate a switching control signal between terminal apparatuses. D4 to D12 are 576-Kb/s data communication channel (DCC) bytes for transferring monitor/control information between terminal apparatuses, Z1 and Z2 are bytes reserved for international use, and E2 is a voice negotiation byte between terminal apparatuses.

In the figure, "X" is a byte reserved for domestic use, "*" is a byte that is not data-scrambled, "Δ" is a byte dependent on media, and a space is a byte reserved for future international standardization.

The SDH standards are not yet totally defined, and they may still be partly amended, or new rules may be added thereto.

For example, a byte (marked with a circle) in the second row and eighth column is called an RS-TS byte (Regenerator Section-Section Trace Byte), and when multiplexed frames are transferred, the RS-ST byte of each STM-1 frame may carry a character among a character string of maximum 15 ASCII code characters. There is, however, a stipulation that this section trace function is achieved with the use of the C1 byte in the RSOH.

A Z2 byte in the ninth row and sixth column is called an MS-REI byte (Multiplex Section Remote Error Indication Byte) or an M1 byte, which may be used by a reception terminal station. Namely, the reception terminal station tests BIP-24 of each received STM-1 frame, loads the number of bit errors counted by the test into the MS-REI byte of a transmission STM-1 frame, and informs (or feeds back) the same to a transmission terminal station.

Although the bytes including RS-ST and MS-REI are referred to when required in the below-mentioned embodiments, the standards for these bytes include undefined factors, and therefore, the bytes will be explained in view of their functions without regard to the positions and names thereof.

Figure 1:
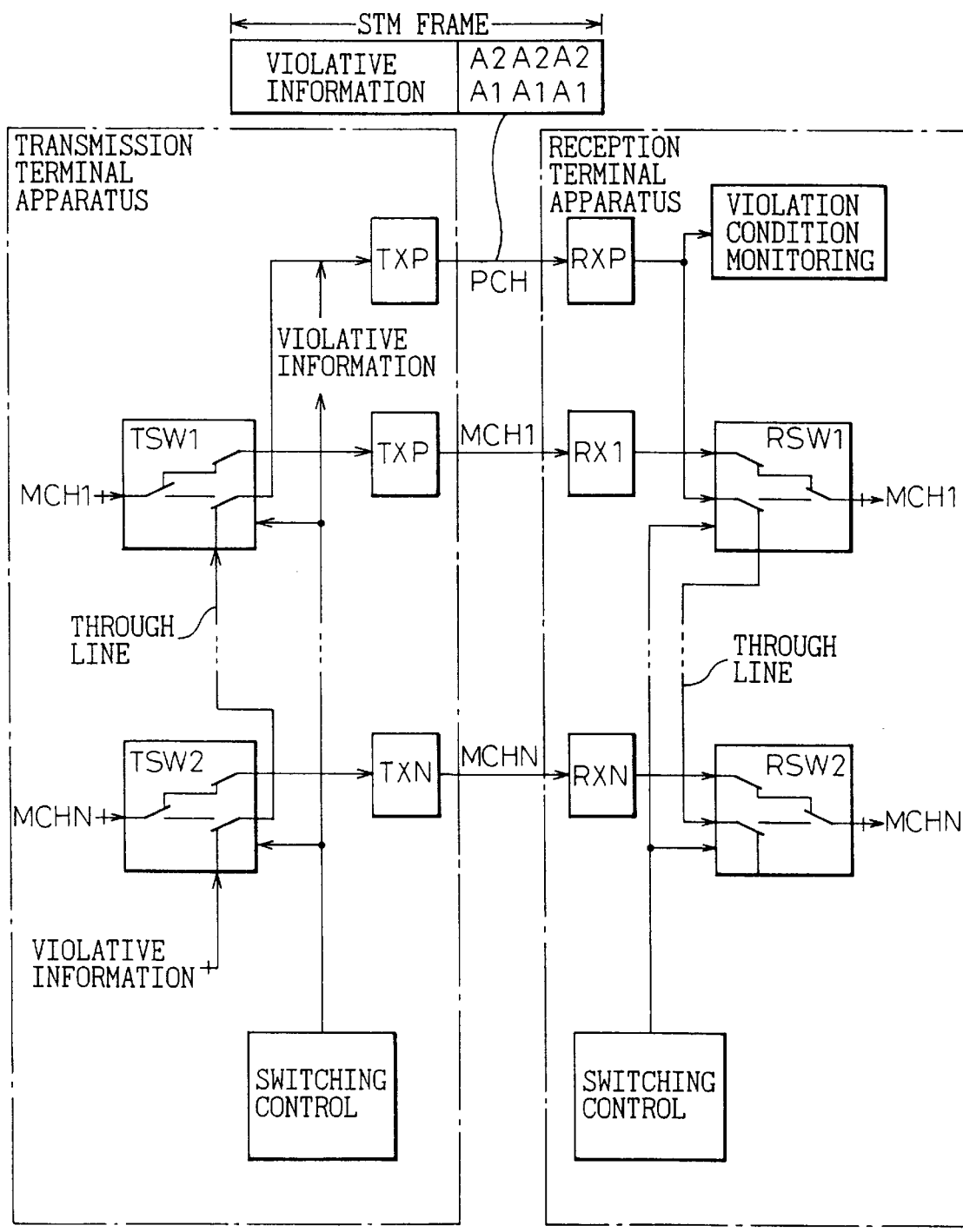
FIG. 1 is a view explaining the principle of the present invention.
Figure 2:
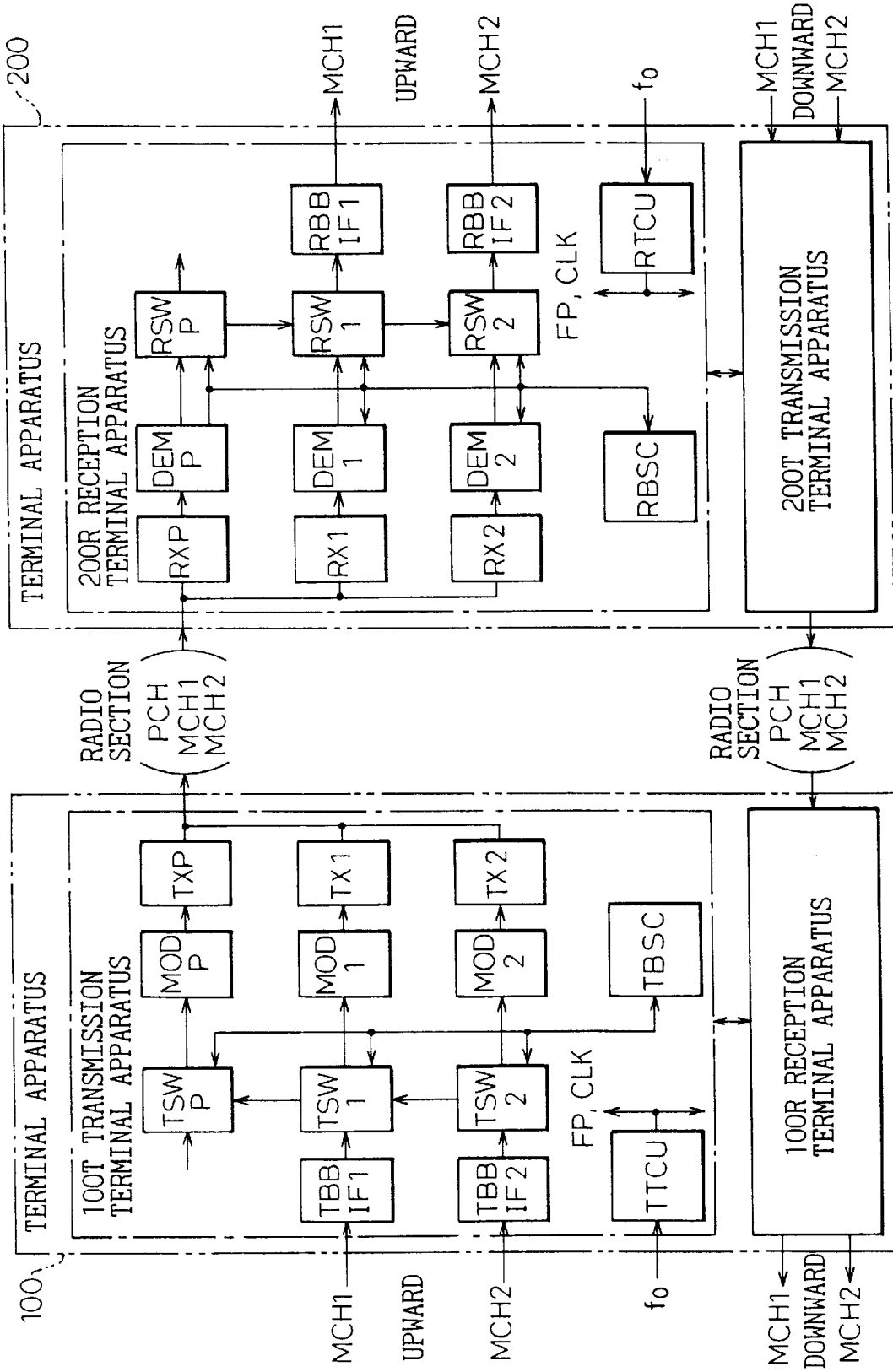
FIG. 2 is a view showing the structure of an SDH multiplex radio transmission system according to an embodiment of the present invention.

FIG. 2 shows the structure of an SDH multiplex radio transmission system according to an embodiment of the present invention.

In the figure, terminal apparatuses 100 and 200 are based on the SDH standards and are connected to each other through radio channels with or without a relay (not shown) between them. Each of the terminal apparatuses 100 and 200 has, for each upward and downward channel, a pair of transmission and reception terminal apparatuses 100T/R and 200T/R to realize two-way communication. Although this type of system generally employs an N+M redundant structure, this embodiment employs a 2+1 redundant structure for the sake of simplicity of explanation.

The SDH system will be briefly explained. A transmitting terminal timing control unit TTCU of each terminal station receives a reference clock signal f0 from a synchronization network to realize network synchronization. Connection with other asynchronous networks and a management process for transmitting main signals between the terminal stations are basically carried out through baseband interfaces TBBIF and RBBIF. Namely, B2 bytes to be inserted into a transmission frame of a main signal MCH1/2 are generated by the interface TBBIF1/2. When this frame is received, a parity check based on the B2 bytes thereof is carried out by the interface RBBIF1/2. Automatic switching control (APS) using K1 and K2 bytes with respect to a spare channel is carried out between switch controllers TBSC and RBSC. A process related to frame synchronization for transmission and reception is carried out between a modulator MOD and a demodulator DEM. Namely, the modulator MODP, MOD1, or MOD2 generates (overwrites) A1 and A2 bytes and transmits them. According to received A1 and A2 bytes, the demodulator DEMP, DEM1, or DEM2 detects frame synchronization and protects the vicinities thereof. The numbers of protected stages for synchronization are seven forward and three backward.

FIGS. 3, 4A, 4B, 5A and 5B are views (1) to (3) explaining a radio transmission system according to the first embodiment of the present invention. In this embodiment, a transmission terminal station transmits a dummy STM-1 frame containing a fixed pattern byte to a spare channel that is not currently used, and a reception terminal station monitors the AU pointer (H1 byte) of an STM-1 frame received through the spare channel, and according to a result of the monitoring, determines whether or not the spare channel is used.

Here, the "dummy STM-1 frame" is an STM-1 frame composed of optional data bytes except A1 and A2 bytes for frame synchronization.

Figure 3:
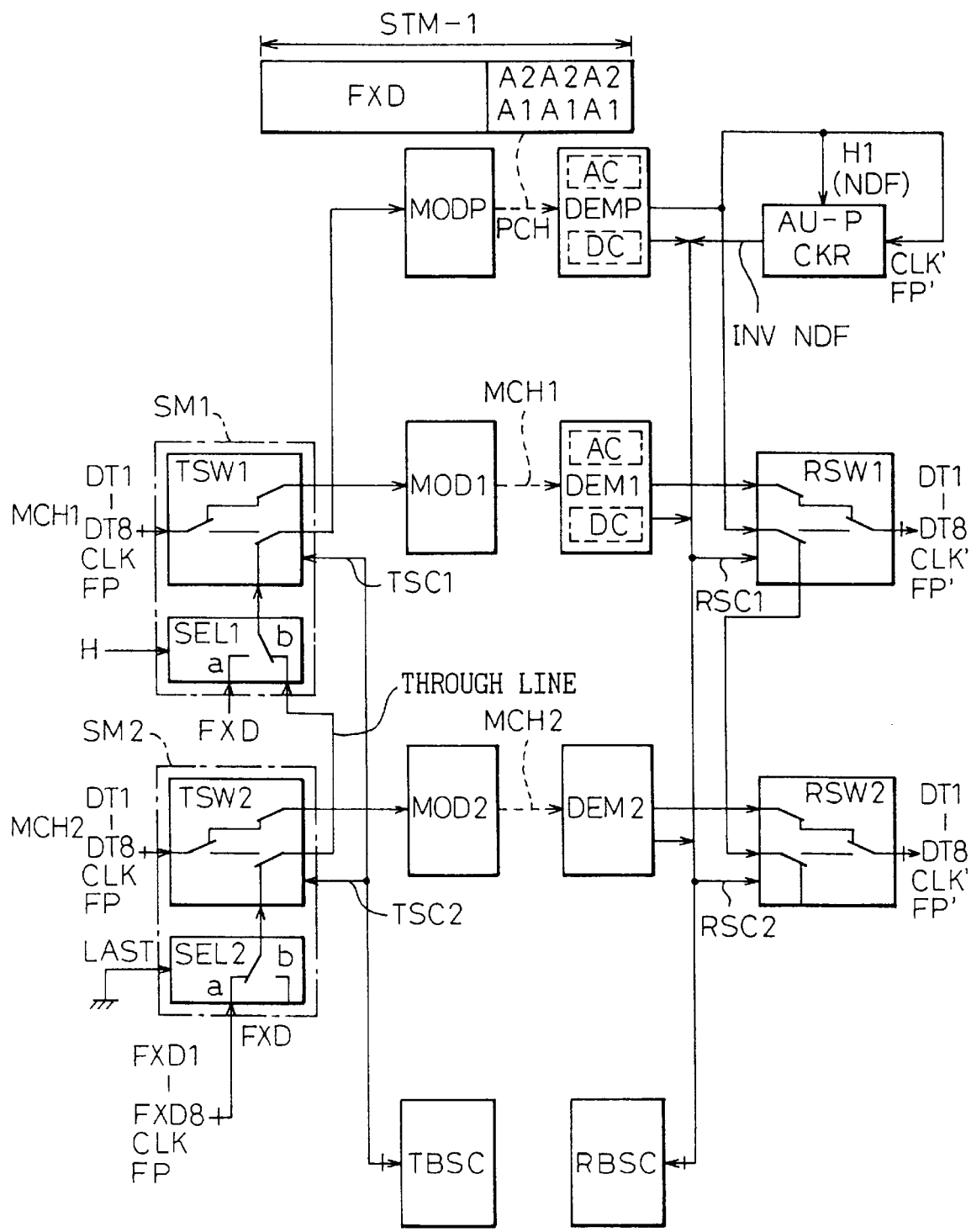
FIG. 3 is a view (1) explaining a radio transmission system according to a first embodiment of the present invention.

FIG. 3 shows the details of a structure for determining whether or not the spare channel is used, according to the first embodiment. In the figure, SM is a switch module, SEL is a data selector, and AU-PCKR is an AU pointer checker for monitoring the AU pointer of a frame received through the spare channel.

In the transmission terminal station, the switch TSW1 and selector SEL1 form a pair and are preferably installed in the same package (substrate, LSI, etc.) to form a unit (switch module SM1) that is insertable and extractable to and from the transmission terminal apparatus. The switch TSW1 receives a main signal MCH1 (data bit signals DT1 to DT8 each corresponding to 19.44 MHz, clock signal CLK, frame synchronization signal FP) from a transmitting terminal baseband interface TBBIF1. The switch TSW1 is in a connection state shown in the figure when a switching signal TSC1 from a switch controller TBSC is 0 to indicate no switching. Namely, the main signal MCH1 is connected to a modulator MOD1, and at the same time, the output of the selector SEL1 is connected to a modulator MODP. On the other hand, a control terminal of the selector SEL1 is open (high level), and therefore, the selector SEL1 selects an input to a terminal b (through line).

The switch module SM2 operates similarly. A control terminal of the selector SEL2, however, receives a select signal LAST (for example, of ground level) that indicates that the switch module SM2 is the last module in a current system, from the outside through, for example, a jumper. Accordingly, the selector SEL2 selects an input to a terminal "a."

The data input terminal "a" of the selector SEL2 further receives, instead of the conventional dummy random data PN, a data byte FXD consisting of fixed bits FXD1 to FXD8, a clock signal CLK (corresponding to 19.44 MHz), and a frame synchronization signal FP. An example of a bit pattern of the data byte FXD is "1100***1" (* being an optional one of 0 and 1). Preferably, each bit "*" is selected so that a signal level is not biased to one side. This data byte FXD is easy to generate. For example, it is incorporated in an LSI of the selector SEL2 in advance, or is provided from outside through a jumper.

The data supplying structure of this type for the selector SEL2 causes no increase in the circuit scale even if it is applied to the selector SEL1. Accordingly, the switch modules SM1 and SM2 may have entirely an identical structure, to easily realize a system having an optional N+1 redundant structure by only inserting and extracting the switch modules SM to and from the apparatus. For example, an 8+1 redundant structure system is realized by installing eight identical switch modules SM in series and by applying the select signal LAST only to a selector SEL8 of the eighth switch module SM8 from, For example, a back plane. In this way, the embodiment eliminates conventional expensive PNGs from a transmission terminal station, provides a mass-production effect due to standardization of the switch modules SM, and realizes flexibility in the structure of the system.

If the spare channel in the structure mentioned above is not currently used, (i.e., if no channel switching is carried out), the main signals MCH1 and MCH2 are connected to the current modulators MOD1 and MOD2, respectively, and the fixed data FXD to the selector SEL2 is passed through the through line that longitudinally runs through the switch modules SM2 and SM1 and reaches the modulator MODP of the spare system. The modulator MODP adds (overwrites), in synchronization with the signal FP, A1 and A2 bytes for frame synchronization to the head of a dummy STM-1 frame whose every byte consists of the fixed data FXD. Then, the modulator MODP modulates them into a radio signal based on, for example, 64QAM and transmits the radio signal to the spare channel PCH.

A demodulator DEMP on the reception terminal station synchronizes the A1 and A2 bytes of a received STM-1 frame, regenerates a frame synchronization signal FP' and a clock signal CLK', and demodulates and reproduces the fixed data FXD. In synchronization with the frame synchronization signal FP', the checker AU-PCKR monitors the AU pointer (H1 byte) of the received STM-1 frame, and according to a method based on, preferably, the below-mentioned SDH standards, determines whether or not the spare channel is free.

Figures 4A, 4B:
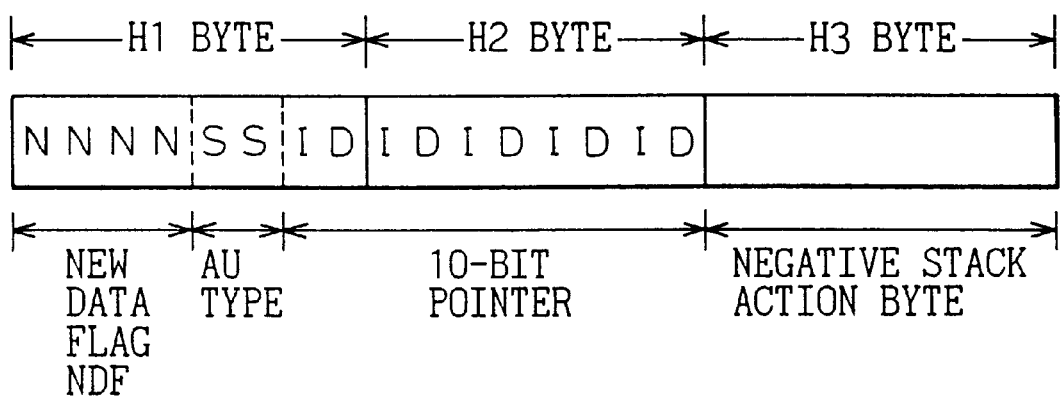
FIGS. 4A and 4B are views explaining the radio transmission system according to the first embodiment.

FIG. 4A shows the structure (corresponding to one VC-3) of the AU pointer.

First four bits of the H1 byte are called N bits and indicate a new data flag (NDF). The N bits are used to change and control the following 10-bit pointer value. Namely, if a payload changes, the N bits are set to "1001" to indicate that there is a change, to instantaneously rewrite the pointer value and shift to a new synchronous state. If there is no change in the pointer value, the N bits are set to "0110" to indicate that there is no change. The following two bits are called S bits and are used to indicate an AU type. Presently, "10" indicating AU-3/AU-4 is defined for the S bits.

FIG. 4B shows NDF reception state definitions.

According to the SDH standards, N bits="1001" indicate that there is a change, i.e., NDF EN (NDF Enable) up to an optional one bit error, and N bits "0110" indicate that there is no change, i.e., NOR NDF (Normal NDF) up to an optional one bit error. If there are two bit errors other than the above, it is determined to be improper NDF, i.e., INV NDF (Invalid NDF). The table of FIG. 4B shows bit patterns for the respective cases.

Figure 5A:
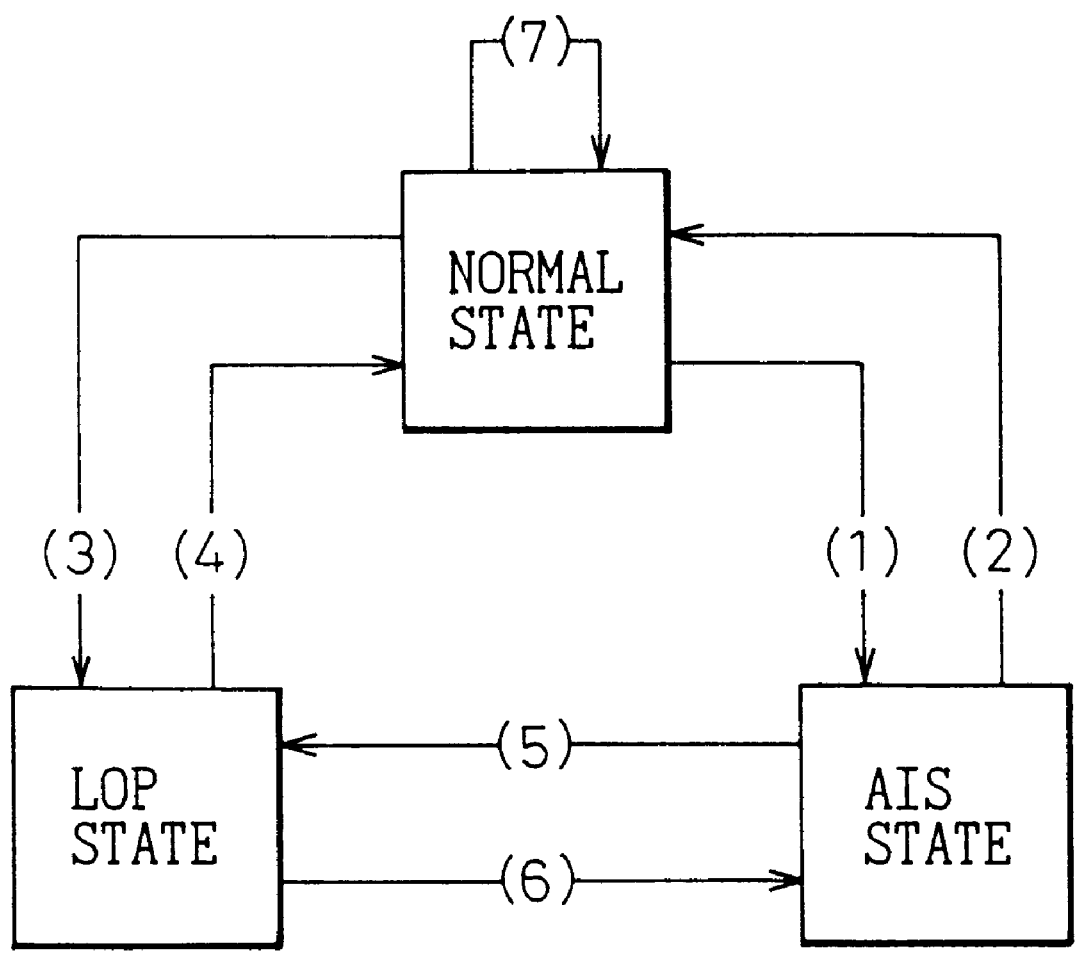

FIG. 5A is a transitional view showing a monitoring state according to a pointer byte, and FIG. 5B shows state transition conditions.

In connection with the main signals MCH1 and MCH2, the switch controller RBSC, etc., carry out status transition control shown in the figure according to data (an AU pointer byte) received at the interfaces RBBIF1 and RBBIF2. The details of this will be found in the documents of the standards. For the spare channel PCH, these kinds of monitoring and controlling by the switch controller RBSC are not carried out. Accordingly, the spare channel PCH is provided with the separate checker AU-PCKR to carry out the monitoring and controlling operations mentioned below.

Namely, the checker AU-PCKR in this case has, for example, a normal state and an LOP (Loss Of Pointer) state. If it is in the normal state, the checker AU-PCKR with the spare channel being unused detects the higher four bits of "1100" (INV NDF) of the fixed data FXD in the N bits of each of eight consecutive frames received. As a result, the normal state shifts to the LOP state, and a decision signal INV NDF=1 (spare channel being unused) is provided.

If the spare channel PCH is switched to, for example, the main signal MCH1, the checker AU-PCKR detects a normal pointer processed by the interface TBBIF1 in each of three consecutive frames. As a result, the state shifts to the normal state, and the decision signal INV NDF=0 (spare channel being in use) is provided.

As a result, the switch controller RBSC of the reception terminal station is able to correctly detect whether or not the spare channel is used, by monitoring the signal INV NDF provided by the checker AU-PCKR.

This type of the checker AU-PCKR is realized with a relatively simple circuit, such as comparators, counters, and flip-flops. Also, the single bit error correction circuit for two codes "1001" and "0110" is easy to form.

The checker AU-PCKR may be discretely formed as shown in FIG. 3. Preferably, it is installed in a digital component unit DC in the demodulator DEMP. In this case, a control circuit related to a pointer process in the RBBIF, RBSC, etc., according to the SDH standards is applicable to the checker AU-PCKR. Further, the demodulators DEMP, DEM1, and DEM2 may have an identical structure with only the test function of the DEMP being energized, to provide an effect of mass production of circuits. These are applicable to any of the following embodiments.

In this way, the first embodiment is capable of eliminating conventional expensive pattern generators PG from the transmission terminal apparatuses 100T and 200T, as well as expensive pattern detectors PD from the reception terminal apparatuses 200R and 100R.

Figure 6:
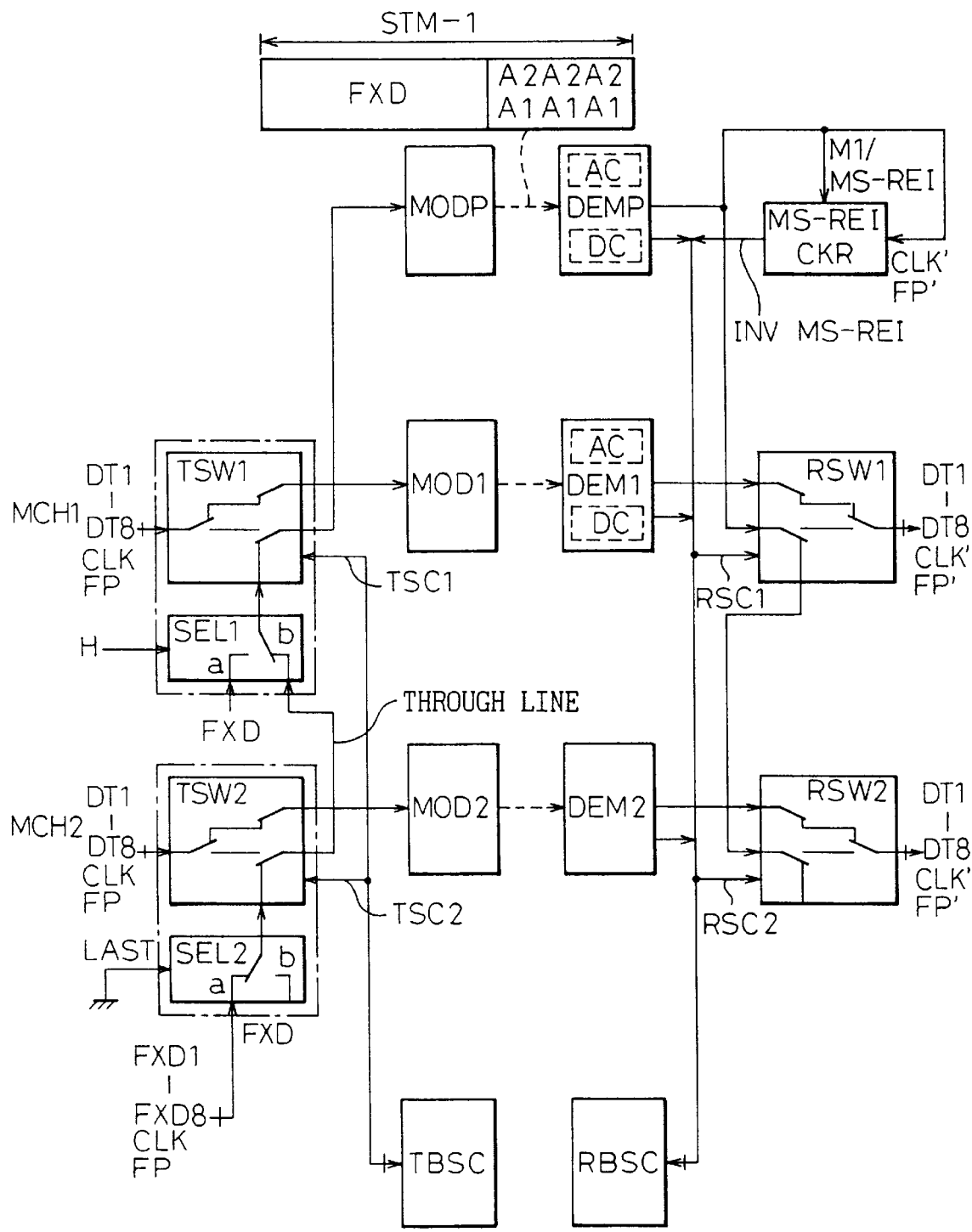
FIG. 6 is a view (1) explaining a radio transmission system according to a second embodiment of the present invention.

FIGS. 6 to 8 are views (1) to (3) explaining a radio transmission system according to the second embodiment of the present invention. In this embodiment, a transmission terminal station transmits a dummy STM-1 frame including a fixed pattern byte to a spare channel that is not currently used, and a reception terminal station monitors an MS-REI (or M1) byte in an STM-1 frame received from the spare channel, and according to a result of the monitoring, determines whether or not the spare channel is used.

FIG. 6 shows the details of the structure of a part for determining whether or not the spare channel is used, according to the second embodiment. In the figure, MS-REICKR is an MS-REI checker for monitoring an MS-REI byte in an STM frame received through the spare channel. The structure of the transmission terminal station may be the same as that of FIG. 3.

Figure 7A:
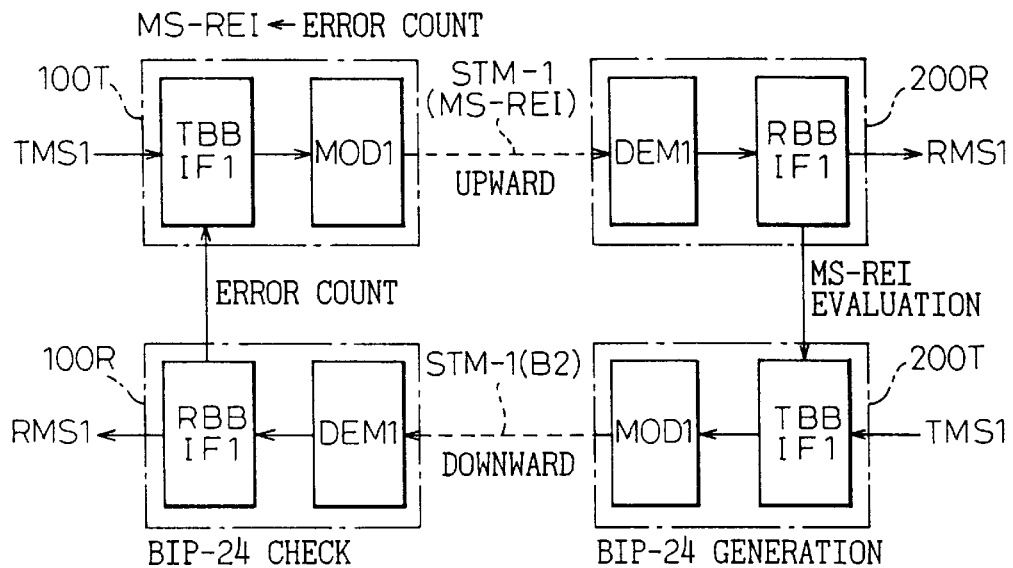
FIGS. 7A and 7B are views explaining the radio transmission system according to the second embodiment.
Figure 7B:
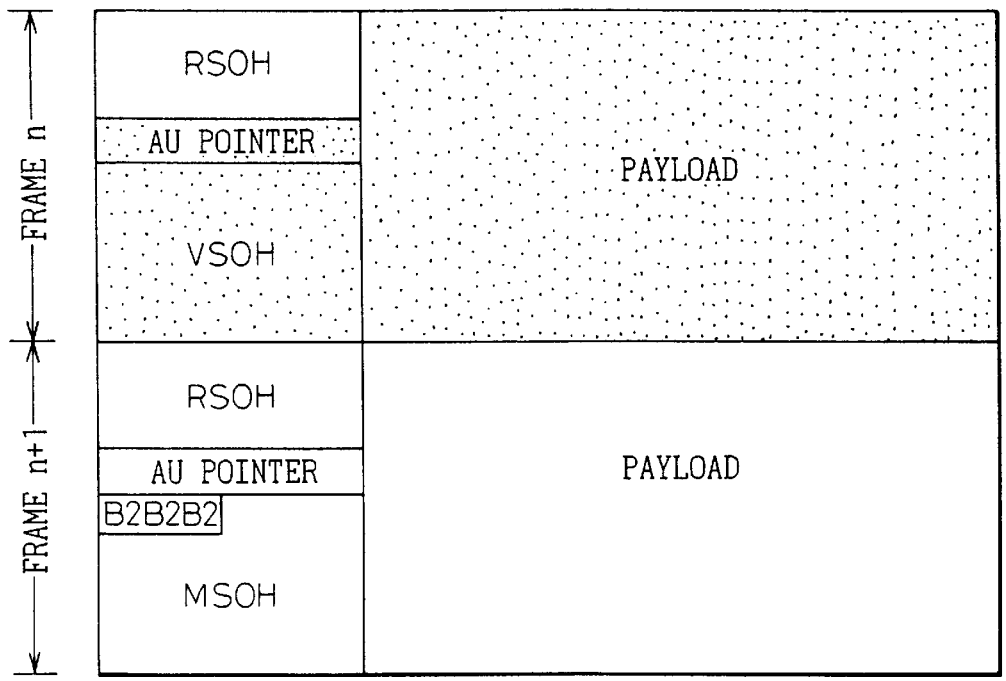

FIG. 7A shows a method of using the MS-REI byte according to the SDH standards. The figure shows a current main signal MS1 and terminal apparatuses for upward and downward lines. FIG. 7B shows a method of calculating BIP-24.

In the transmission terminal apparatus 200T for the downward line, an interface TBBIF1 carries out a bit interleave parity operation for every 24th bit on all information except RSOH of an "n"th frame that is not scrambled yet, to provide a 3-byte operation result (even parity). This result is inserted into B2 bytes of an "n+1"th frame that is not scrambled yet and is transmitted to the reception terminal apparatus 100R of the downward line.

In the reception terminal apparatus 100R, an interface RBBIF1 carries out a bit interleave parity operation on every 24th bit for all received information except RSOH of an "n"th descrambled frame, compares a result of the operation with the B2 bytes of a received "n+1"th descrambled frame, and codes MS-FEBE (Multiplex Section Far End Block Error) for informing the transmission side of an error monitor result according to the number of bit errors (the number of bits on which disagreement has been found).

Figures 8A, 8B:
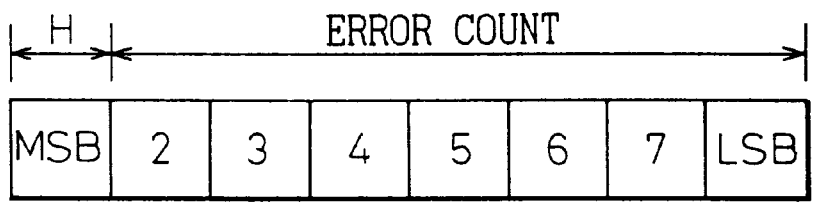
FIGS. 8A and 8B are views explaining the radio transmission system according to the second embodiment.

FIG. 8B shows the coding of MS-FEBE.

The first bit (MSB) of the MS-FEBE is always set to "1." If the result of an own BIP-24 operation agrees with the received B2 bytes, the bit error count number is 0. As a result, the second and the following bits of the MS-FEBE are coded as "0000000." If disagreement exists only in one bit, the bit error count number is 1, and the bits are coded as "0000001." In this way, the MS-FEBE is coded, and the maximum count number of bit errors is 24, which is coded as "0011000." There is no coding above this.

FIG. 8A shows the bit structure of the MS-RET byte.

The MS-FEBE obtained as mentioned above is transferred to the transmission terminal apparatus 100T of the upward channel. An interface TBBIF1 of the transmission terminal apparatus 100T receives the MS-FEBE, inserts the information about the same into an MS-REI byte of the upward channel, and transmits it to the reception terminal apparatus 200R. An interface RBBTF1 of the reception terminal apparatus 200R evaluates the contents of the received MS-REI byte. In this way, the data originator, i.e., the terminal apparatus 200 is able to remotely monitor the occurring state of bit errors.

Returning to FIG. 6, the checker MS-REICKR according to the embodiment continuously detects, under the SDH standards and if the spare channel PCH is not currently used, a violation code "1100***" that is not usually present, in the MS-REI byte of every received STM frame. As a result, a decision signal INV MS-REI=1 (the spare channel being unused) is provided.

If the spare channel PCH is switched to, for example, the main signal MCH1, the checker MS-REICKR detects a normal MS-REI byte processed by the interface TBBIF1 continuously in every frame, and therefore, provides a decision signal INV MS-REI=0 (the spare channel being in use).

Consequently, the switch controller RBSC of the reception terminal station is able to correctly know whether or not the spare channel is free by monitoring the signal INV MS-REI provided by the checker MS-REICKR.

Figure 9:
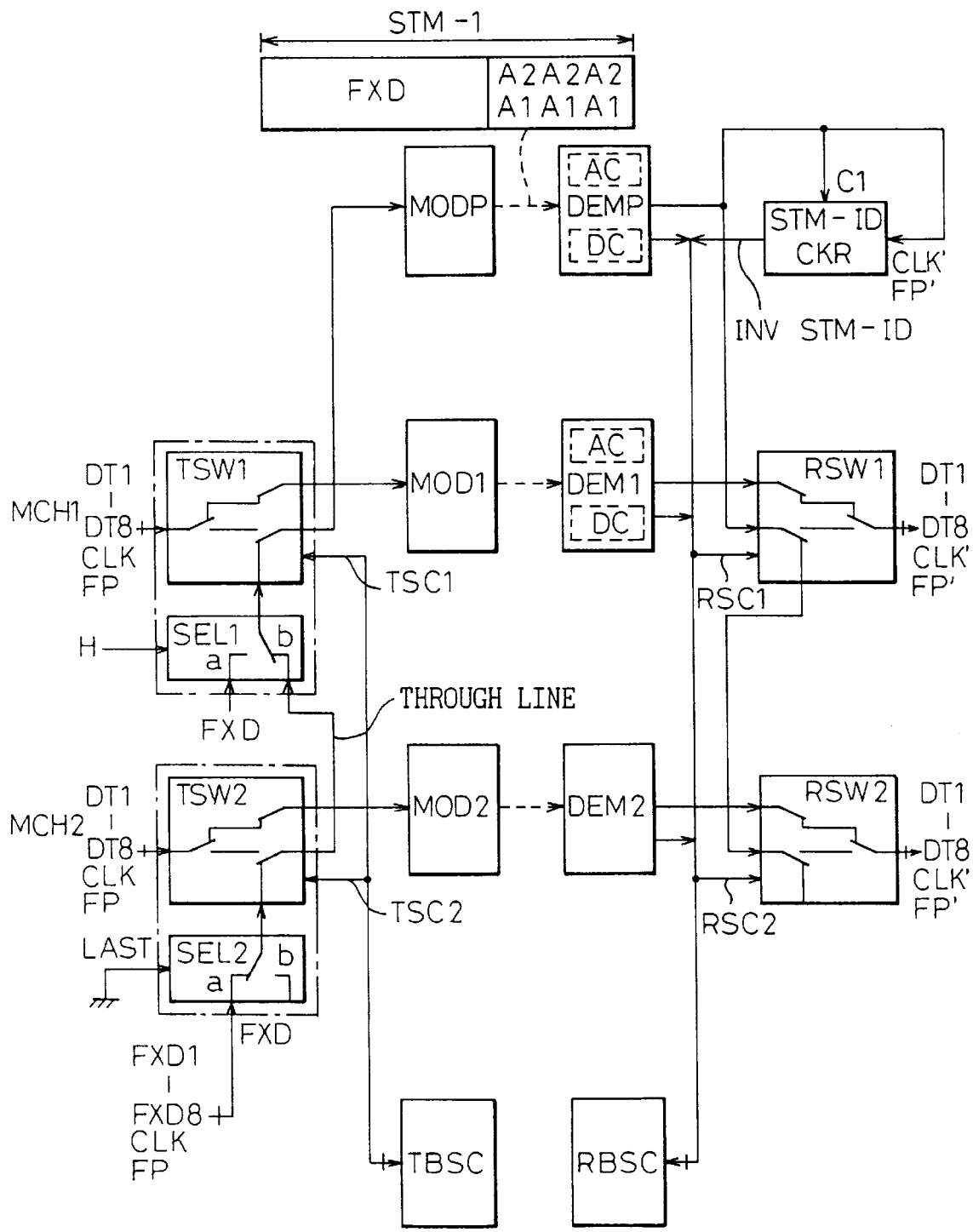
FIG. 9 is a view explaining a radio transmission system according to a third embodiment of the present invention.

FIG. 9 is a view explaining a radio transmission system according to the third embodiment of the present invention. In this embodiment, a transmission terminal station transmits a dummy STM-1 frame including a fixed pattern byte to a spare channel that is not in use, and a reception terminal station monitors an STM-ID byte in an STM-1 frame transmitted through the spare channel, and according to a result of the monitoring, determines whether or not the spare channel is in use.

FIG. 9 shows the details of the structure of a part for determining whether or not the spare channel is used according to the third embodiment. In the figure, STM-IDCKR is an STM-ID checker for monitoring an STM-ID (C1) byte in an STM frame received through the spare channel. The structure of the transmission terminal station may be the same as that of FIG. 3. The STM-ID of an STM-1 frame according to the SDH standards is supposed to be "00000001."

With this structure, the checker STM-IDCKR continuously detects, if the spare channel PCH is not used, an improper data byte FXD="1100***1" for STM-ID in each received frame and provides a decision signal INV STM-ID=1 to indicate that the spare channel is unused.

If the spare channel PCH is switched to, for example, a main signal MCH1, the checker STM-IDCKR continuously detects an STM-ID byte of "00000001" properly processed by an interface TBBIF1 in every frame, and provides a decision signal INV STM-ID=0 to indicate that the spare channel is in use.

Consequently, a switch controller RBSC of the reception terminal station is able to correctly know whether or not the spare channel is free by monitoring the signal INV STM-ID from the checker STM-IDCKR.

Figure 10:
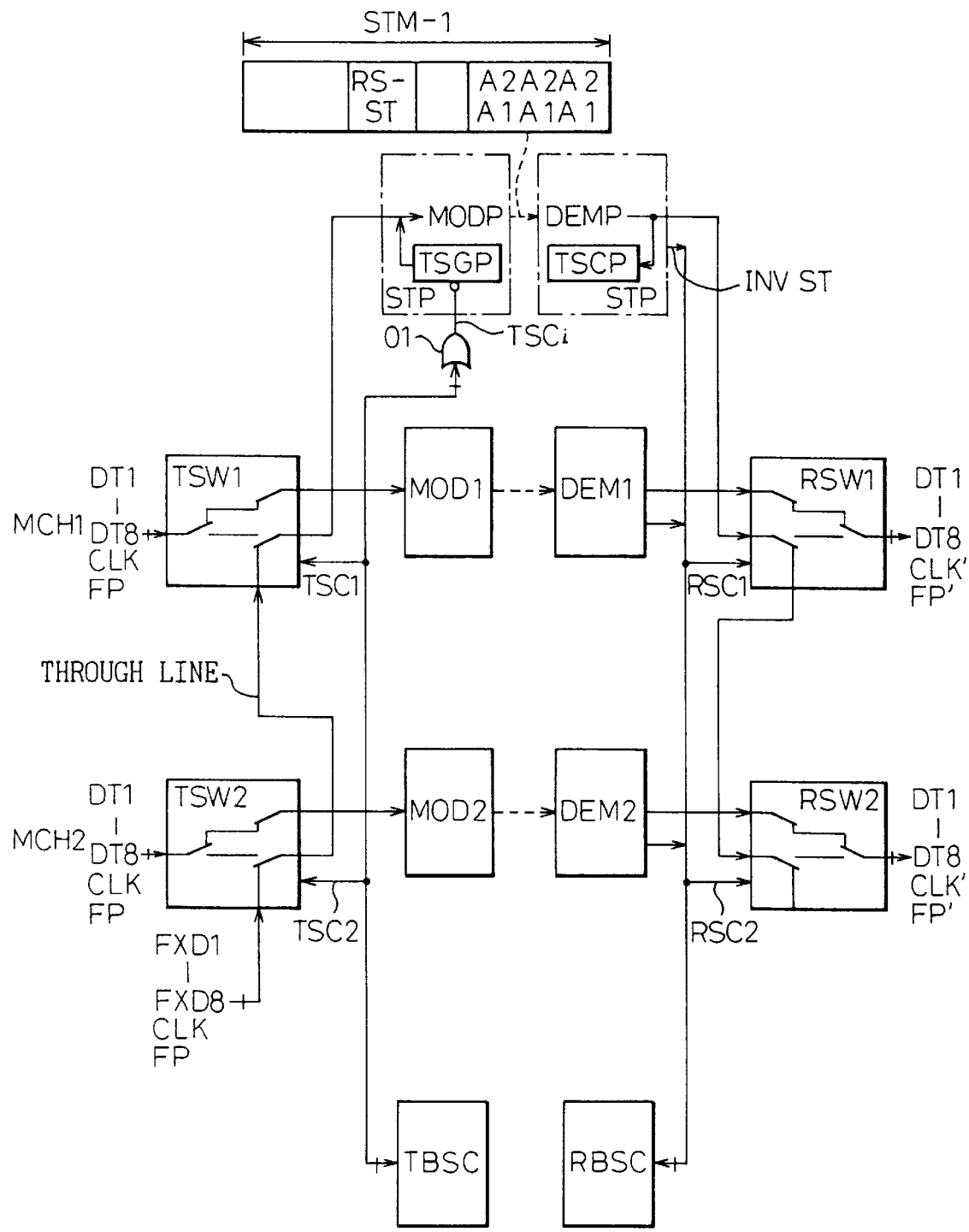
FIG. 10 is a view (1) explaining a radio transmission system according to a fourth embodiment of the present invention.
Figures 11A, 11B:
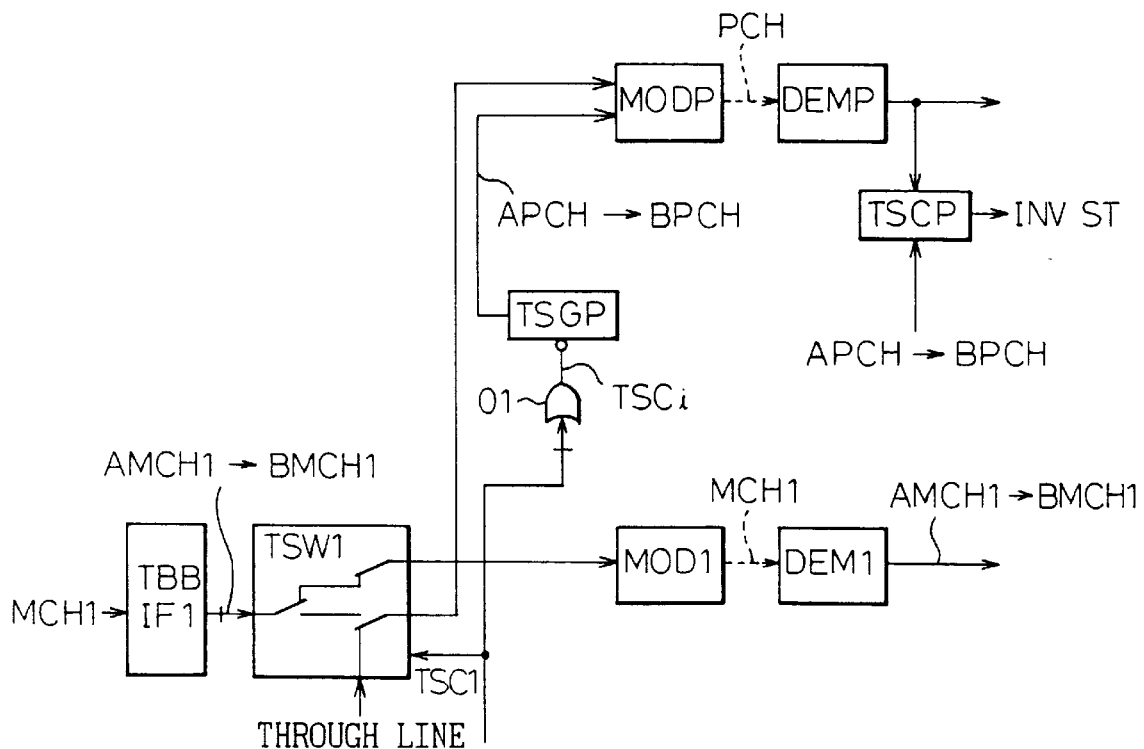
FIGS. 11A and 11B are views explaining the radio transmission system according to the fourth embodiment.

FIGS. 10, 11A and 11B are views (1) and (2) explaining a radio transmission system according to the fourth embodiment. In this embodiment, a transmission station terminal transfers multiplexed dummy STM-1 frames each including an RS section trace byte to a spare channel that is not used. A reception terminal station monitors the RS section trace byte of each STM-1 frame received through the spare channel, and according to a result of the monitoring, determines whether or not the spare channel is used.

FIG. 10 shows the details of the structure of a part for determining whether or not the spare channel is used according to the fourth embodiment of the present invention. In the figure, TSGP is a trace signal generator for generating a section trace signal STP specific to its own spare channel, TSCP is a trace signal checker for checking a section trace signal STP specific to its own spare channel, and O1 is an OR gate circuit. In this embodiment, switches TSW1 and TSW2 are not provided with selectors SEL1 and SEL2.

By using the RS section trace (RS-ST) function, a specific string of 15 ASCII characters is provided for each channel in advance, a transmission terminal station transfers multiplexed frames with the specific character string, and a reception terminal station compares a received character string with an expected character string of its own. If they agree with each other, the reception terminal station determines that it is a matched section trace, and if they disagree with each other, a mismatched section trace. If there are many channels, using this function easily detects a connection state between terminal stations and effectively prevents an erroneous connection of channels between terminal stations.

FIG. 11A shows the frame format of a trace signal.

The first bits (MSB) of trace data are called multi-frame indicator bits, which are F0 to FF whose contents indicate a transfer sequence of multiplexed frames. The multiplexed frames are 16 STM-1 frames with the bit F0 of the first STM-1 frame being 1 and the bits F1 to FF of the following 15 STM-1 frames being each 0. Xmn (m being 1 to F and n being 1 to 7) are ASCII character codes and form the data portion of the section trace signal. C1 to C7 are CRC-7 parity bits into which a result of CRC-7 parity operation for the trace signal of the multiplexed frames is inserted. In this connection, a generating function is $X^7+X^3+1$. The CRC-7 operation is carried out on every bit of frame numbers 0 to 15 by fixing F0=1, C1 to C7=0, and F1 to FF=0 and is compared with CRC-7 bits at the head of the next frame, to detect an error.

Returning to FIG. 10, a switch controller TBSC of the transmission terminal station sets switching signals TSC1 and TSC2 each to 0 to indicate no channel switching, if the spare channel is not currently used. As a result, the input of a modulator MODP is connected to a through line. The modulator MODP generates a dummy STM-1 frame according to signals FP and CLK. In this state, the OR gate circuit O1 provides a low level because the signals TSC1 and TSC2 are each 0. As a result, the trace signal generator TSGP is energized to sequentially generate a section trace signal STP specific to the spare channel at the timing of transmitting the RS-ST bytes of each dummy STM-1 frame. This rewrites the contents of the RS-ST bytes of the transmission dummy STM-1 frame. If required, the trace signal generator TSGP carries out a CRC-7 operation and generates CRC-7 parity bits.

In this embodiment, however, the trace signal generator TSGP is required only to generate the section trace signal STP specific to the spare channel on the transmission side, so that these pieces of information generated in advance may simply be read out of a ROM.

A demodulator DEMP of the reception terminal station synchronizes received STM-1 frames and regenerates dummy STM-1 frames according to signals FP' and CLK'. The trace signal checker TSCP extracts RS-ST bytes from each received STM frame according to the regenerated signal FP', compares a received trace signal STP with a trace signal STP of its own, provides a normal signal if they agree with each other and an abnormal signal (INV ST) if they do not agree with each other.

On the other hand, for main signals MCH1 and MCH2, the transmission terminal station transfers section trace signals ST1 and ST2 specific to them, respectively. These signals are checked at the reception terminal station. However, the section trace signals ST1 and ST2 for the main signals MCH1 and MCH2 are generated by interfaces TBBIF1 and TBBIF2 of the transmission terminal station, and the CRC-7 checking of the received information and the comparison thereof with expected values of the reception terminal station are carried out by interfaces RBBIF1 and RBBIF2.

With reference to FIG. 11B, a method of employing the trace signal to determine whether or not the spare channel has been switched will be explained in detail. If no channel switching is carried out in the transmission terminal station, the switch TSW1, etc., are in a connection state shown in the figure. On the spare channel PCH of the transmission terminal station, the signals TSC1 and TSC2 of each 0 energize the trace signal generator TSGP, to insert an RS-ST signal of "APCH→BPCH" into multiplexed STM frames at the timing of each RS-ST byte, and they are transferred through the spare channel PCH. This "APCH→BPCH" signal means that it is a signal running from a spare channel PCH of a station A to a spare channel PCH of a station B.

On the current channel MCH1, the interface TBBIF1 inserts a section trace signal of "AMCH1→BMCH1" into multiplexed STM frames, and they are transferred through the current channel MCH1. This "AMCH1→BMCH1" signal means that it is a signal running from the current channel MCH1 of the station A to the current channel MCH1 of the station B. These matters are also applicable to the current channel MCH2.

In this state, the trace signal checker TSCP of the spare channel PCH of the reception terminal station finds that the received RS-ST signal "APCH→BPCH" agrees with its own value of "APCH→BPCH", and therefore, provides a decision signal INV ST=0 (spare channel being unused). If required, the decision signal INV ST=0 may be provided after the agreement of signals is continuously detected several times. At the same time, the interfaces RBBIF1 and RBBIF2 of the current channels MCH1 and MCH2 also find agreement between received values and expected values, so that the process proceeds normally.

If the transmission terminal station switches, for example, the current channel MCH1 to the spare channel PCH, the switch TSW1 is disconnected from the modulator MOD1 and is connected to the modulator MODP. At the same time, the through line extending from the lower side of the figure is disconnected. The trace signal generator TSGP of the transmission terminal station energizes the OR gate circuit O1 due to TSC1=1, thereby stopping the generation of the RS-ST signal "APCH→BPCH."

On the other hand, the modulator MODP at this moment receives the main signal MCH1 from the interface TBBIF1, and therefore, transfers multiplexed STM frames including the RS-ST signal "AMCH1→BMCH1." As a result, the trace signal checker TSCP of the reception terminal station finds disagreement between the received RS-ST signal "AMCH1→BMCH1" and an expected value "APCH→BPCH" of its own, and therefore, provides a decision signal INV ST=1 (spare channel being in use). If required, the decision signal INV ST=1 may be provided after disagreement is continuously obtained several times. The main signal MCH1 received through the spare channel is transferred to the interface RBBIF1 through a switch RSW1 (not shown), and the interface RBBIF1 finds agreement between the received value and an expected value. As a result, the main signal MCH1 is normally processed.

Accordingly, a switch controller RBSC of the reception terminal station monitors the decision signal INV ST from the demodulator DEMP (i.e., the trace signal checker TSCP) to correctly know whether or not the spare channel is free. In this regard, there is a specification stipulating that this section trace function is carried out with the use of the C1 byte of the RSOH.

Figure 12:
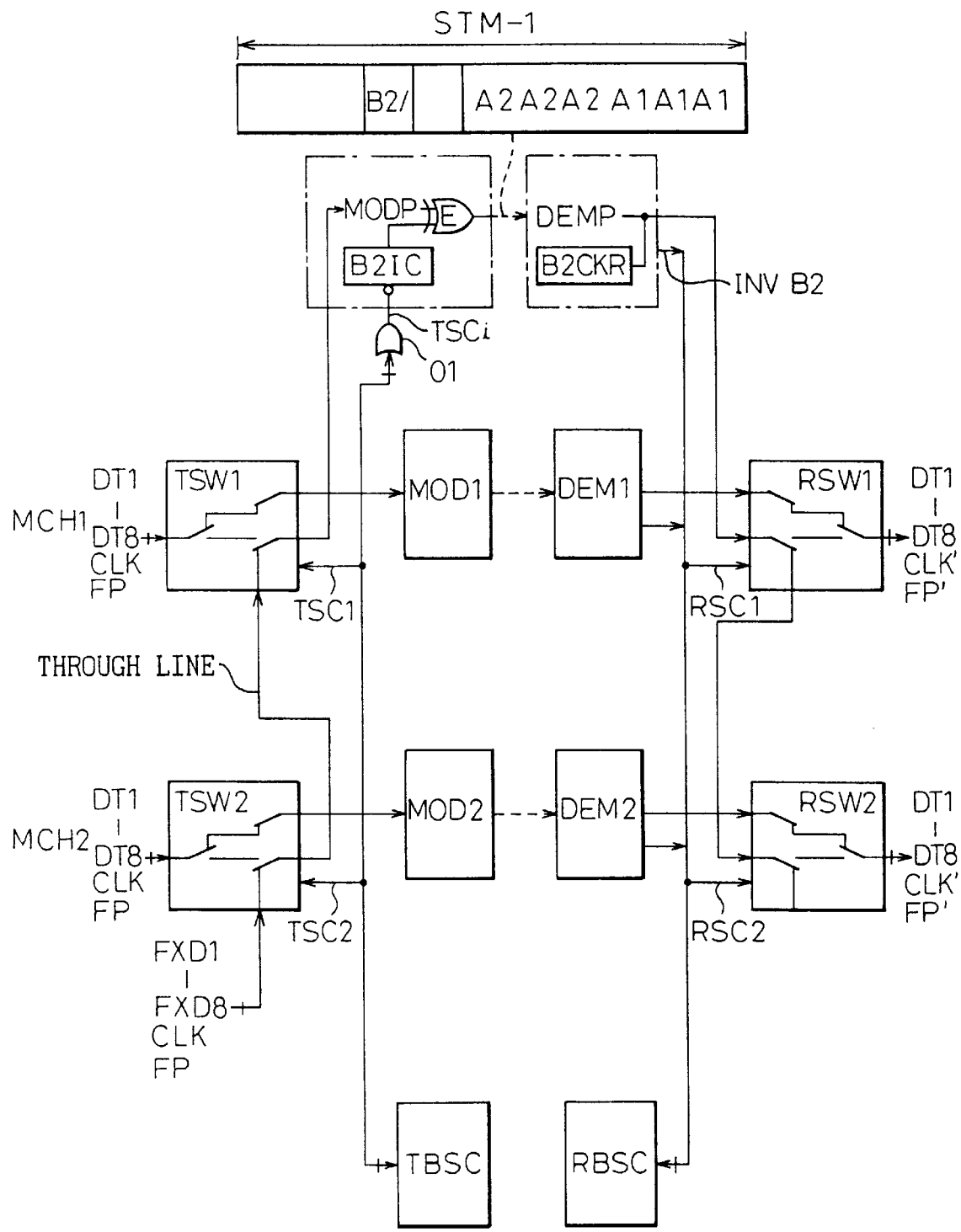
FIG. 12 is a view explaining a radio transmission system according to a fifth embodiment of the present invention.

FIG. 12 is a view explaining a radio transmission system according to the fifth embodiment. This embodiment inverts the BIP-24 (B2) bytes of an STM-1 frame to be transmitted from a transmission terminal station to a spare channel that is not used. A reception terminal station carries out a parity check with the BIP-24 bytes of an STM-1 frame received through the spare channel, and according to a result of the check, determines whether or not the spare channel is used.

FIG. 12 shows the details of a part for determining whether or not the spare channel is used according to the fifth embodiment. In the figure, B2IC is a controller for inverting B2 bytes, B2CKR is a parity checker according to BIP-24, and E is an EX-OR circuit.

Generating B2 bytes and the BIP-24 checking with the use of received B2 bytes are as explained above.

In the figure, if the spare channel PCH is not used, a through line is connected to an input of a modulator MODP, and fixed data FXD="1100*1" is transferred to all data bytes except A1 and A2 bytes. An operation range of BIP-24 according to the SDH standards is, as shown in FIG. 7B, 2403 bytes in total. If every one third thereof, i.e., every 801 bytes (odd bytes) are subjected to a BIP-8 operation, each resultant B2 byte is "1100*1," which agrees with the fixed data FXD="1100***1." Accordingly, this causes no parity error at the reception terminal station, if it is transmitted as it is.

If the B2 bytes of each STM frame are inverted at the transmission end, each B2 byte of a transmitted "n"th frame will be "0011*0," and therefore, the reception terminal station expects to receive "0011*0" as each B2 byte of an "n+1"th frame. However, the transmission side inverts the B2 bytes of the "n+1"th frame and transmits "0011***0." Accordingly, the reception terminal station detects no parity error in this case, too.

Accordingly, the controller B2IC of this embodiment is energized with signals TSC1 and TSC2 being each 0 if no channel switching is carried out, and inverts the B2 bytes of every second STM frame to be transmitted.

As a result, the checker B2CKR of the reception terminal station carries out a BIP-24 operation on received data of, for example, an "n"th frame and generates "0011*0" as each B2 byte for an "n+1"th frame. Then, the "n+1"th frame from the transmission side is received as "1100*1" for each B2 byte, thereby causing a parity error. Thereafter, in the checker B2CKR of the reception terminal station, a BIP-24 operation on the received data of the "n+1"th frame generates "1100*1" as each B2 byte for an "n+2"th frame. However, the "n+2"th frame from the transmission side is received as "0011*0" for each B2 byte, thereby detecting a parity error. Consequently, the checker B2CKR in this case continuously detects a BIP-24 parity error in each frame, and after detecting a predetermined number of consecutive errors, provides a decision signal INV B2=1 (spare channel being unused).

If the spare channel PCH is switched to, for example, a main signal MCH1, the inversion control of the controller B2IC is turned off with TSC1=1. In this case, the checker B2CKR receives an STM frame properly processed by an interface TBBIF1, and therefore, detects no BIP-24 parity error. In this case, after detecting a predetermined number of consecutive non-errors, a decision signal INV B2=0 (spare channel being used) is provided.

Consequently, by monitoring the decision signal INV B2 from the checker B2CKR, a switch controller RBSC of the reception terminal station may correctly know whether or not the spare channel is free.

Although the above embodiments relate to the SDH multiplex radio transmission systems, the present invention is also applicable to SDH multiplex optical transmission systems.

Although the above embodiments relate to the N+1 redundant structure systems, the present invention is able to multiplex spare channels and through lines, and can be applied to a general N+M redundant structure system.

Although the above embodiments relate to the STM-1 frame processing, the present invention is applicable to each STM-1 frame in STM-N (N=4, 16, etc.) frames because the STM-N frames are formed by simply N-byte-multiplexing the STM-1 frame. In addition, the present invention is applicable to an STM-0 frame whose size is one third of the STM-1.

Although the preferred embodiments of the present invention have been explained above, many modifications may be made on the structures, control, and combinations thereof without departing from the spirit of the present invention.

As explained above, the present invention provides an SDH multiplex system in which a transmission terminal side transfers predetermined violation information to a spare channel that is not currently used, so that a reception terminal side may correctly determine whether or not the spare channel is currently used. This system effectively uses STM frames and is achievable with a simple structure.

What is claimed is:

1. An SDH multiplex transmission system comprising a transmission terminal apparatus and a reception terminal apparatus that are connected to each other through a plurality of working channels and at least one spare channel to be used instead of any one of said working channels when a failure occurs in any one of said working channels, in which:

the transmission terminal apparatus loads predetermined information into an overhead of an STM frame and transmits the STM frame to said spare channel, said predetermined information indicating whether or not said spare channel is used instead of any one of said working channels by making said predetermined information in agreement with the SDH standards when said spare channel is used instead of any one of said working channels, and by making said predetermined information in disagreement with the SDH standards when said spare channel is not used instead of any one of said working channels; and the reception terminal apparatus monitors an STM frame received through the spare channel, and if the received STM frame includes in its overhead said predetermined information which is in disagreement with the SDH standards, said reception terminal apparatus determines that the spare channel is not used instead of any one of said working channels.

2. The SDH multiplex transmission system of claim 1, wherein the transmission terminal apparatus loads information based on standards into an H1 byte in an overhead and transmits the same, and the reception terminal apparatus monitors an H1 byte in a received overhead for a predetermined violation condition.

3. The SDH multiplex transmission system of claim 1, wherein the transmission terminal apparatus loads violation information into an MS-REI byte in an overhead and transmits the same, and the reception terminal apparatus monitors an MS-REI byte in a received overhead for a violation condition.

4. The SDH multiplex transmission system of claim 1, wherein the transmission terminal apparatus loads violation information into an STM-ID byte in an overhead and transmits the same, and the reception terminal apparatus monitors an STM-ID byte in a received overhead for a predetermined violation condition.

5. An SDH multiplex transmission system comprising a transmission terminal apparatus and a reception terminal apparatus that are connected to each other through channels of a plurality of working channels and at least one spare channel to be used instead of any one of said working channels when a failure occurs in any one of said working channels, in which:

the transmission terminal apparatus loads information into each RS section trace byte of multiplexed STM frames and transmits the same to the spare channel, said information being specific to said spare channel when said spare channel is not used instead of any one of said working channels, and said information being specific to any one of said working channels when said spare channel is used instead of any one of said working channels; and the reception terminal apparatus compares the information in each RS section trace byte obtained from multiplexed STM frames received through the spare channel with information of its own specific to the spare channel and generated in said reception terminal apparatus, and if they agree with each other, determines that the spare channel is not used instead of any one of said working channels.

6. The SDH multiplex transmission system of claim 5, wherein the transmission and reception terminal apparatuses are connected to each other through radio channels of an N+1 redundant structure, the transmission terminal apparatus inserts, by modulation means of its own for the spare channel, information specific to the spare channel, and the reception terminal apparatus carries out, by demodulation means of its own for the spare channel, comparison and coincidence detection operations.

7. An SDH multiplex transmission system comprising a transmission terminal apparatus and a reception terminal apparatus that are connected to each other through a plurality of working channels and at least one spare channel to be used instead of any one of said working channels when a failure occurs in any one of said working channels, in which:

the transmission terminal apparatus inverts each BIP-24 parity byte in every second STM frame and transmits the same to said spare channel when said spare channel is not used instead of any one of said working channels; and the reception terminal apparatus carries out a parity check on each BIP-24 parity byte of each STM frame received through the spare channel, and if a predetermined parity error detection condition is met, determines that the spare channel is not used instead of any one of said working channels.

8. In an SDH multiplex transmission system having a transmission terminal apparatus and a reception terminal apparatus that are connected to each other through a plurality of working channels and at least one spare channel to be used instead of any one of said working channels when a failure occurs in any one of said working channels, the transmission terminal apparatus comprising:

main signal lines for connecting input main signals to said working channels:

a through signal line for connecting any one of the input main signals to said spare channel;

transmission terminal channel switches each for connecting, when a channel switching signal is extinguished, an input main signal line to an output main signal line and an input through signal line to an output through signal line, and when the channel switching signal is energized, the input main signal line to the output through signal line and disconnects the input through signal line; and selectors each being disposed in the input through signal line of each of said transmission terminal channel switches, for connecting, when a selection signal is extinguished, an input through signal line to the input through signal line of the transmission terminal channel switch, and when the selection signal is energized, a signal of a second input terminal to the input through signal line of the transmission terminal channel switch, each of the selectors being integral with each of the transmission terminal channel switches, to form a switch module that is insertable and extractable to and from the apparatus, in which:

an optional number of such switch modules are installed in series in the apparatus with only the selection signal of the last one of the switch modules being energized to apply a predetermined signal to the through signal line said predetermined signal indicating whether or not said spare channel is used instead of any one of said working channels by making said predetermined information in disagreement with the SDH standards when said spare channel is not used instead of any one of said working channels.

9. The transmission terminal apparatus of claim 8, wherein the predetermined signal applied to the second input terminal of the selector is fixed information that violates one, two, or more SDH overhead standards.

10. An SDH multiplex transmission system comprising:

a transmission terminal apparatus for transmitting data in a multiplexed SDH frame according to SDH standards; and a reception terminal apparatus for receiving data according to said SDH standards, said reception terminal apparatus being connected to said transmission terminal apparatus through a plurality of working channels and at least one spare channel to be used instead of one of said working channels when a fault is detected in any one of said working channels;

said transmission terminal apparatus including;

a plurality of transmitting switching modules each having a first input terminal for receiving a main channel signal, a second input terminal for receiving predetermined information indicating that said spare channel is not used as any one of said working channels, a first output terminal connected to a corresponding one of said working channels, a second output terminal connected to said spare channel, and a control input terminal for receiving a switching signal from said reception terminal apparatus, said predetermined information being defined to be transmitted through an overhead of an STM frame in said multiplexed SDH frame;

said reception terminal apparatus including;

a monitoring unit for monitoring an STM frame in a receiving signal transmitted through said spare channel to determine whether or not said spare channel is used as a working channel by judging whether or not the receiving signal in the STM frame coincides with information equal to said predetermined information so as to output a control signal according to the determination; and a plurality of reception switching modules each having a first input terminal for receiving a signal from a corresponding one of said working channels, a second input terminal for receiving a signal from said spare channel, a control input terminal for receiving said control signal, and an output terminal for outputting the signal from said corresponding working channel or said spare channel in response to said control signal, said control signal being also supplied to said control terminals of said transmitting switching modules;

wherein when a fault occurs in one of said working channels, the corresponding transmitting switching module switches to output said main channel signal to said spare channel when said spare channel is not used as one of said working channels.

11. The SDH multiplex transmission system according to claim 10, wherein said predetermined information is sent through H1 byte in the overhead of said STM frame.

12. The SDH multiplex transmission system according to claim 10, wherein said predetermined information is sent through an MS-REI byte in the overhead of said STM frame.

13. The SDH multiplex transmission system according to claim 10, wherein said predetermined information is sent through a STM-ID byte in the overhead of said STM frame.

14. The SDH multiplex transmission system according to claim 10, wherein said predetermined information is specific to said spare channel when said spare channel is not used instead of any one of said working channels, said predetermined information being sent through an RS section trace byte in said STM frame.

15. The SDH multiplex transmission system according to claim 14, wherein said transmission terminal apparatus comprises modulation means for inserting said predetermined information into said overhead of said STM frame in the spare channel when said spare channel is not used instead of any one of said working channels, and said reception terminal apparatus comprises demodulation means for comparing the received predetermined information with information generated in said reception terminal apparatus.

16. The SDH multiplex transmission system according to claim 10, wherein said predetermined information is BIP-24 parity byte which is inverted every second STM frame, said reception terminal apparatus carries out a parity check on each BIP-24 parity byte of each STM frame received through the spare channel, and if a predetermined parity error detection condition is met, determines that the spare channel is not used instead of any one of said working channels.

17. The SDH multiplex transmission system according to claim 10, further comprising a plurality of selectors each being disposed in an input through signal line of each of said transmission terminal channel switches, for connecting, when a selection signal is extinguished, an input through signal line to the input through signal line of the transmission terminal channel switch, and when the selection signal is energized, a signal of a second input terminal to the input through signal line of the transmission terminal channel switch, each of the selectors being integral with each of the transmission terminal channel switches, to form a switch module that is insertable and extractable to and from the apparatus, in which:

an optional number of such switch modules are installed in series in the apparatus with only the selection signal of the last one of the switch modules being energized to apply a predetermined signal to the through signal line.

* * * * *